United States Patent
Zhang et al.

(10) Patent No.: US 11,546,890 B2
(45) Date of Patent: Jan. 3, 2023

(54) INTRA-SYMBOL MULTIPLEXING WITH SINGLE CARRIER WAVEFORM

(71) Applicant: QUALCOMM Incorporated, San Diego, CA (US)

(72) Inventors: Xiaoxia Zhang, San Diego, CA (US); Jing Sun, San Diego, CA (US); Jun Ma, San Diego, CA (US); Zhifei Fan, San Diego, CA (US); Wooseok Nam, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/115,613

(22) Filed: Dec. 8, 2020

(65) Prior Publication Data
US 2022/0182993 A1    Jun. 9, 2022

(51) Int. Cl.
*H04W 72/04* (2009.01)
*H04L 27/26* (2006.01)

(52) U.S. Cl.
CPC ..... *H04W 72/0406* (2013.01); *H04L 27/2605* (2013.01); *H04W 72/0446* (2013.01)

(58) Field of Classification Search
CPC ... H04L 5/0048; H04L 5/0007; H04L 5/0044; H04L 5/0051; H04L 2/2602; H04L 1/0067; H04L 27/2613; H04L 27/2636; H04L 5/0053; H04L 27/2607; H04L 27/26; H04L 5/00; H04W 72/042; H04W 56/001; H04W 72/04; H04W 56/00; H04B 7/0626; H04B 7/06

USPC .......................................................... 370/329
See application file for complete search history.

(56) References Cited

U.S. PATENT DOCUMENTS

| | | | | |
|---|---|---|---|---|
| 7,110,352 | B2 * | 9/2006 | Wang | H04L 27/2607 370/320 |
| 7,376,117 | B2 * | 5/2008 | Erlich | H04L 1/0071 435/103 |
| 10,506,596 | B2 * | 12/2019 | Yerramalli | H04W 16/14 |
| 10,674,501 | B2 | 6/2020 | Sun et al. | |
| 11,082,950 | B2 * | 8/2021 | Li | H04W 72/02 |
| 11,153,855 | B2 * | 10/2021 | Matsumura | H04L 27/2636 |

(Continued)

*Primary Examiner* — Man U Phan
(74) *Attorney, Agent, or Firm* — Holland & Hart LLP

(57) ABSTRACT

Methods, systems, and devices for wireless communications are described. Devices in a wireless communications system may support different configurations to support intra-symbol multiplexing for communications between the devices using a single carrier waveform. For example, the different configurations may include symbol level cyclic prefixes, device-specific or channel-specific cyclic prefixes, device-specific or channel-specific guard intervals, or a combination thereof to support the intra-symbol multiplexing. That is, the cyclic prefixes or guard intervals may separate different fractions of a symbol, such that individual signals communicated in each of the different fractions do not leak into a subsequent fraction to cause interference. In some implementations, the cyclic prefixes or guard intervals may be enabled for a subset of devices or channels. A configuration for this intra-symbol multiplexing with device-specific or channel-specific cyclic prefixes or guard intervals may be signaled in a control message to the corresponding devices.

30 Claims, 25 Drawing Sheets

(56) References Cited

U.S. PATENT DOCUMENTS

| | | | |
|---|---|---|---|
| 2007/0237254 A1* | 10/2007 | Pi | H04B 7/12 |
| | | | 375/267 |
| 2019/0090220 A1* | 3/2019 | Li | H04W 8/005 |
| 2020/0220681 A1* | 7/2020 | Yang | H04L 5/001 |
| 2021/0021450 A1* | 1/2021 | Zhang | H04L 5/0007 |
| 2021/0022044 A1* | 1/2021 | Zhang | H04L 5/001 |
| 2021/0105079 A1* | 4/2021 | Lei | H04J 13/0074 |
| 2021/0298009 A1* | 9/2021 | Almquist | H04W 16/14 |

* cited by examiner

INTRA-SYMBOL MULTIPLEXING WITH SINGLE CARRIER WAVEFORM

FIELD OF TECHNOLOGY

The following relates to wireless communications, including intra-symbol multiplexing with a single carrier waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station and a UE may communicate using multiplexed transmissions. For example, the multiplexed transmissions may include multiple transmitted messages that are combined into one transmitted signal over a shared medium. Techniques are desired for more efficient multiplexing of multiple messages into a single combined signal.

SUMMARY

The described techniques relate to improved methods, systems, devices, and apparatuses that support intra-symbol multiplexing with single carrier waveform. Generally, the described techniques provide for a first device (e.g., a UE) to receive a time domain resource assignment allocating one or more fractions of a symbol (e.g., or a different length time interval) for communications with a second device (e.g., a base station) and to identify an intra-symbol multiplexing configuration for the symbol based on the time domain resource assignment. For example, the first device may identify the intra-symbol multiplexing configuration based on receiving a control message from the second device indicating the intra-symbol multiplexing configuration. Subsequently, the first device and the second device may then communicate a single carrier waveform (e.g., a single-carrier quadrature amplitude modulation (SC-QAM) waveform) using the intra-symbol multiplexing configuration and based on the time domain resource assignment. In some examples, the intra-symbol multiplexing configuration may include symbol level cyclic prefixes, device-specific or channel-specific cyclic prefixes, device-specific or channel-specific guard intervals, or a combination thereof that are included with different fractions of the time domain resource assignment.

A method for wireless communications at a UE is described. The method may include receiving, from a base station, a time domain resource assignment allocating a fraction of a symbol period for communications with the base station, identifying an intra-symbol multiplexing configuration for the symbol period based on the time domain resource assignment, and communicating, with the base station, a single carrier waveform within the symbol period in accordance with the intra-symbol multiplexing configuration and the time domain resource assignment.

An apparatus for wireless communications at a UE is described. The apparatus may include a processor, memory in electronic communication with the processor, and instructions stored in the memory. The instructions may be executable by the processor to cause the apparatus to receive, from a base station, a time domain resource assignment allocating a fraction of a symbol period for communications with the base station, identify an intra-symbol multiplexing configuration for the symbol period based on the time domain resource assignment, and communicate, with the base station, a single carrier waveform within the symbol period in accordance with the intra-symbol multiplexing configuration and the time domain resource assignment.

Another apparatus for wireless communications at a UE is described. The apparatus may include means for receiving, from a base station, a time domain resource assignment allocating a fraction of a symbol period for communications with the base station, means for identifying an intra-symbol multiplexing configuration for the symbol period based on the time domain resource assignment, and means for communicating, with the base station, a single carrier waveform within the symbol period in accordance with the intra-symbol multiplexing configuration and the time domain resource assignment.

A non-transitory computer-readable medium storing code for wireless communications at a UE is described. The code may include instructions executable by a processor to receive, from a base station, a time domain resource assignment allocating a fraction of a symbol period for communications with the base station, identify an intra-symbol multiplexing configuration for the symbol period based on the time domain resource assignment, and communicate, with the base station, a single carrier waveform within the symbol period in accordance with the intra-symbol multiplexing configuration and the time domain resource assignment.

In some examples of the method, apparatuses, and non-transitory computer-readable medium described herein, identifying the intra-symbol multiplexing configuration may include operations, features, means, or instructions for receiving, from the base station, a control message indicating the intra-symbol multiplexing configuration.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix and a cyclic prefix within a resource of the time domain resource assignment.

In some examples of the method, apparatuses, and non-transitory computer-readable medium described herein, communicating the single carrier waveform within the symbol period may include operations, features, means, or instructions for communicating the single carrier waveform within the symbol period including a cyclic prefix preceding a resource of the time domain resource assignment.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix for the symbol period.

In some examples of the method, apparatuses, and non-transitory computer-readable medium described herein where the resource assignment is one of a set of multiple time domain resource assignments allocating a set of channels within the symbol period, communicating the single carrier waveform within the symbol period may include operations, features, means, or instructions for communicating the single carrier waveform within the symbol period including a symbol level cyclic prefix and a cyclic prefix within at least one resource assignment of the set of multiple time domain resource assignments.

In some examples of the method, apparatuses, and non-transitory computer-readable medium described herein, communicating the single carrier waveform within the symbol period may include operations, features, means, or instructions for communicating the single carrier waveform within the symbol period including a guard interval corresponding to a resource of the time domain resource assignment, where an additional guard interval occurs in a second symbol period preceding the symbol period.

In some examples of the method, apparatuses, and non-transitory computer-readable medium described herein, communicating the single carrier waveform within the symbol period may include operations, features, means, or instructions for communicating the single carrier waveform within the symbol period based on a guard interval occurring in a second symbol period preceding the symbol period.

In some examples of the method, apparatuses, and non-transitory computer-readable medium described herein where the resource assignment is one of a set of multiple time domain resource assignments allocating a set of channels within the symbol period, communicating the single carrier waveform within the symbol period may include operations, features, means, or instructions for communicating the single carrier waveform within the symbol period including a guard interval for at least one resource assignment of the set of multiple time domain resource assignments, where an additional guard interval occurs in a second symbol period preceding the symbol period.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix and a guard interval corresponding to a resource of the time domain resource assignment.

A method for wireless communications at a base station is described. The method may include transmitting, to one or more UEs, a set of multiple time domain resource assignments that allocate respective fractions of a symbol period, identifying an intra-symbol multiplexing configuration for the symbol period based on the set of multiple time domain resource assignments, and communicating, with the one or more UEs, a single carrier waveform within the symbol period in accordance with the intra-symbol multiplexing configuration and the set of multiple time domain resource assignments.

An apparatus for wireless communications at a base station is described. The apparatus may include a processor, memory in electronic communication with the processor, and instructions stored in the memory. The instructions may be executable by the processor to cause the apparatus to transmit, to one or more UEs, a set of multiple time domain resource assignments that allocate respective fractions of a symbol period, identify an intra-symbol multiplexing configuration for the symbol period based on the set of multiple time domain resource assignments, and communicate, with the one or more UEs, a single carrier waveform within the symbol period in accordance with the intra-symbol multiplexing configuration and the set of multiple time domain resource assignments.

Another apparatus for wireless communications at a base station is described. The apparatus may include means for transmitting, to one or more UEs, a set of multiple time domain resource assignments that allocate respective fractions of a symbol period, means for identifying an intra-symbol multiplexing configuration for the symbol period based on the set of multiple time domain resource assignments, and means for communicating, with the one or more UEs, a single carrier waveform within the symbol period in accordance with the intra-symbol multiplexing configuration and the set of multiple time domain resource assignments.

A non-transitory computer-readable medium storing code for wireless communications at a base station is described. The code may include instructions executable by a processor to transmit, to one or more UEs, a set of multiple time domain resource assignments that allocate respective fractions of a symbol period, identify an intra-symbol multiplexing configuration for the symbol period based on the set of multiple time domain resource assignments, and communicate, with the one or more UEs, a single carrier waveform within the symbol period in accordance with the intra-symbol multiplexing configuration and the set of multiple time domain resource assignments.

In some examples of the method, apparatuses, and non-transitory computer-readable medium described herein, identifying the intra-symbol multiplexing configuration may include operations, features, means, or instructions for transmitting, to the one or more UEs, a control message indicating the intra-symbol multiplexing configuration.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix and a respective cyclic prefix within each resource assignment of the set of multiple time domain resource assignments.

In some examples of the method, apparatuses, and non-transitory computer-readable medium described herein, communicating the single carrier waveform within the symbol period may include operations, features, means, or instructions for communicating the single carrier waveform within the symbol period including a respective cyclic prefix for each resource assignment of the set of multiple time domain resource assignments.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix prior to a beginning resource assignment of the set of multiple time domain resource assignments.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix and a cyclic prefix within at least one resource assignment of the set of multiple time domain resource assignments.

In some examples of the method, apparatuses, and non-transitory computer-readable medium described herein, communicating the single carrier waveform within the symbol period may include operations, features, means, or instructions for communicating the single carrier waveform within the symbol period including a respective guard interval within each resource assignment of the set of multiple time domain resource assignments, where an additional guard interval occurs in a second symbol period preceding the symbol period.

In some examples of the method, apparatuses, and non-transitory computer-readable medium described herein, communicating the single carrier waveform within the symbol period may include operations, features, means, or instructions for communicating the single carrier waveform within the symbol period based on a guard interval occurring in a second symbol period preceding the symbol period.

In some examples of the method, apparatuses, and non-transitory computer-readable medium described herein, communicating the single carrier waveform within the symbol period may include operations, features, means, or instructions for communicating the single carrier waveform within the symbol period including a guard interval for at least one resource assignment of the set of multiple time domain resource assignments, where an additional guard interval occurs in a second symbol period preceding the symbol period.

In some examples of the method, apparatuses, and non-transitory computer-readable medium described herein, communicating the single carrier waveform within the symbol period may include operations, features, means, or instructions for communicating the single carrier waveform within the symbol period including a symbol level cyclic prefix preceding a beginning resource assignment of the set of multiple time domain resource assignments and a guard interval within at least one of the set of multiple time domain resource assignments.

DETAILED DESCRIPTION

Figure 1:
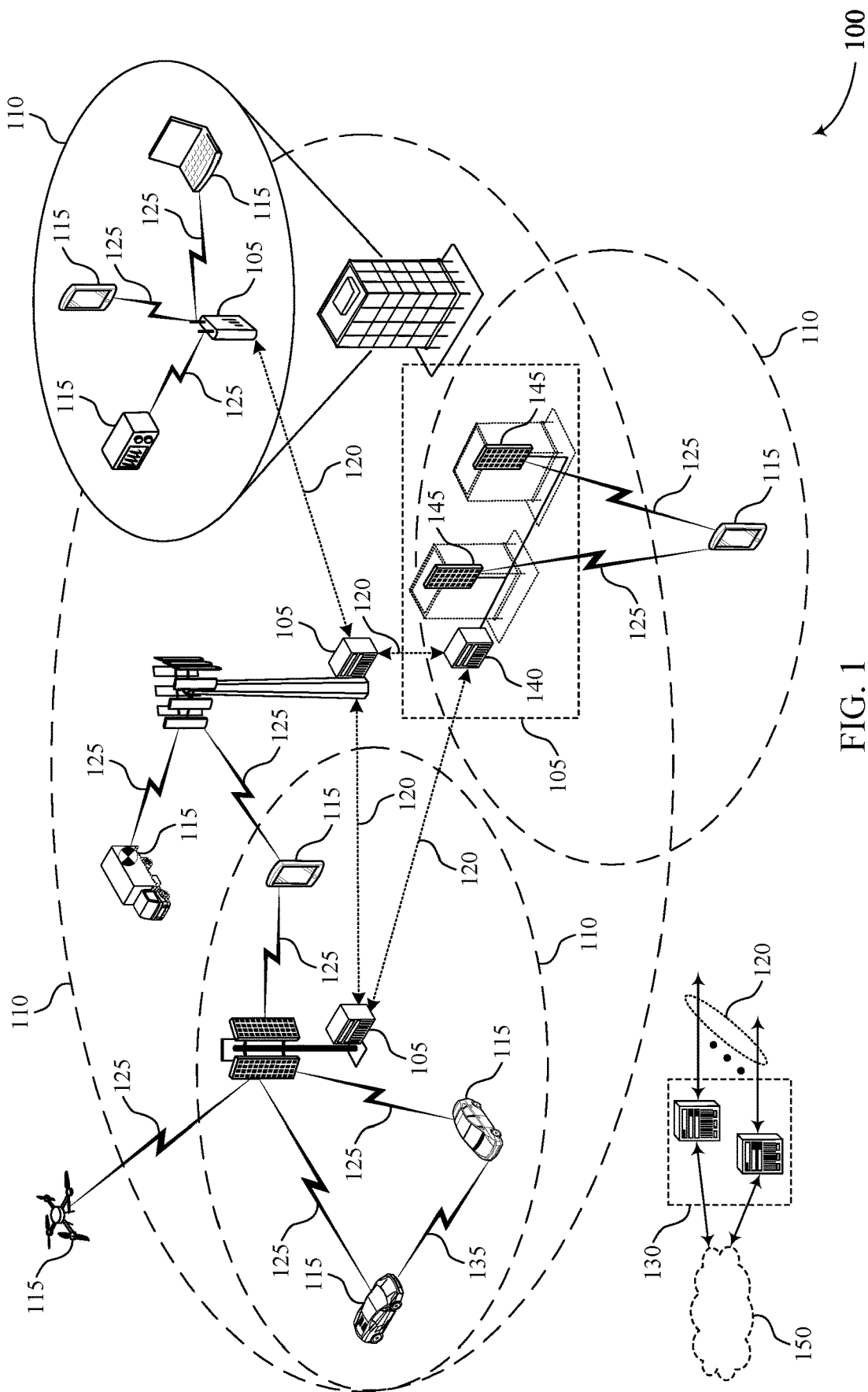
FIG. 1 illustrates an example of a wireless communications system that supports intra-symbol multiplexing with single carrier waveforms in accordance with aspects of the present disclosure.

In some wireless communications systems, resource allocations for communications in uplink and downlink directions may include a high granularity. For example, frequency domain assignments may be in the unit of resource block group (RBG) or a single resource block (RB) (e.g., 12 subcarriers), and time domain assignments may span different numbers of symbols in a slot. Additionally, the time domain assignments may have higher granularities of fractional assignments within a single symbol. In some cases, based on the fractional assignments within the single symbol, communications for multiple devices or for multiple channels may be multiplexed to occur within the single symbol (e.g., intra-symbol multiplexing). Accordingly, techniques are desired to ensure communications within a symbol do not affect other communications within the same symbol. For example, a first data transmission within a symbol may leak into a subsequent data transmission within the symbol, causing the subsequent data transmission to be impaired or unsuccessfully transmitted.

As described herein, a cyclic prefix, a guard internal, or both, may be added within time domain resource assignments that allocate different fractions of a same symbol period to different UEs or for different channels (i.e., intra-symbol multiplexing) to reduce signal leakage within the same symbol period between the different fractions of the symbol period. That is, the cyclic prefixes, guard intervals, or both may separate each of the different fractions from each other, such that signals communicated in each fraction of the symbol period do not leak into a subsequent fraction of the symbol period to cause interference. For example, cyclic prefixes or guard intervals may be introduced in addition to symbol level cyclic prefixes or guard intervals that occur prior to the symbol period. Additionally or alternatively, a symbol level cyclic prefix may be used for the entire symbol, and additional guard intervals may be inserted for some of the devices or channels. In some implementations, the cyclic prefixes or guard intervals may be enabled for a subset of the devices or channels. A configuration for this intra-symbol multiplexing with the device-specific or channel-specific cyclic prefixes or guard intervals may be signaled in a control message to the corresponding devices (e.g., via radio resource control (RRC) signaling, a medium access control (MAC) control element (CE), or in a dynamic downlink control information (DCI) grant).

Aspects of the disclosure are initially described in the context of wireless communications systems. Additionally, aspects of the disclosure are illustrated by an additional wireless communications system, different examples of multiplexing configurations, and a process flow. Aspects of the disclosure are further illustrated by and described with reference to apparatus diagrams, system diagrams, and flowcharts that relate to intra-symbol multiplexing with single carrier waveforms.

FIG. 1 illustrates an example of a wireless communications system 100 that supports intra-symbol multiplexing with single carrier waveform in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems (e.g., NR systems), prior to communicating, two devices may perform a resource allocation determination to identify resources for transmitting messages back and forth between the two devices. In some cases, the resource allocation may be in the unit of RBs (e.g., in the frequency domain) and OFDM or single carrier FDM (SC-FDM) symbols (e.g., in the time domain) for both downlink and uplink communications. For a first type of resource allocation (e.g., a resource allocation type 0), the frequency domain assignment may be in the unit of RBG. For a second type of resource allocation (e.g., a resource allocation type 1), the frequency domain assignment may be in the unit of a single RB (12 subcarriers). Additionally, in the time domain, a single downlink channel (e.g., a physical downlink shared channel (PDSCH)) may span two (2) to 14 symbols within a single slot. That is, based on these different types of resource allocations, the time and frequency domain resource allocations may have high granularity.

With a time domain waveform (e.g., an SC-QAM waveform), it may be desirable to maintain user multiplexing within one symbol (e.g., similar to OFDM/SC-FDM waveforms in NR). In some cases, frequency domain multiplexing may be achieved by configuring a device (e.g., a UE 115) with different BWPs. However, for a given BWP, it may be beneficial to have user multiplexing when one traffic for a given device does not span the full bandwidth of the time domain waveform (e.g., SC-QAM waveform) with an integer number of time domain symbols for the time domain waveform. To compensate for reduced frequency domain flexibility, intra-symbol user or channel multiplexing for a single carrier waveform may be used. However, configurations for the intra-symbol user or channel multiplexing have yet to be defined to enable such multiplexing.

As described herein, wireless communications system 100 may support different variations (e.g., different configurations) to support intra-symbol multiplexing for communications between two devices using a single carrier waveform. For example, the different variations may include cyclic prefixes or guard intervals that are introduced in addition to symbol level cyclic prefixes or guard intervals that occur prior to a symbol period to support the intra-symbol multiplexing. That is, the cyclic prefixes, guard intervals, or both may separate different fractions of a symbol from each other, such that individual signals communicated in each of the different fractions of the symbol (e.g., intra-symbol multiplexed transmissions) do not leak into a subsequent fraction of the symbol period to cause interference for a subsequent individual signal. In some implementations, the cyclic prefixes or guard intervals may be enabled for a subset of devices or channels. A configuration for this intra-symbol multiplexing with device-specific or channel-specific cyclic prefixes or guard intervals may be signaled in a control message to the corresponding devices (e.g., via RRC signaling, a MAC CE, in a dynamic DCI grant, etc.).

Figure 2:
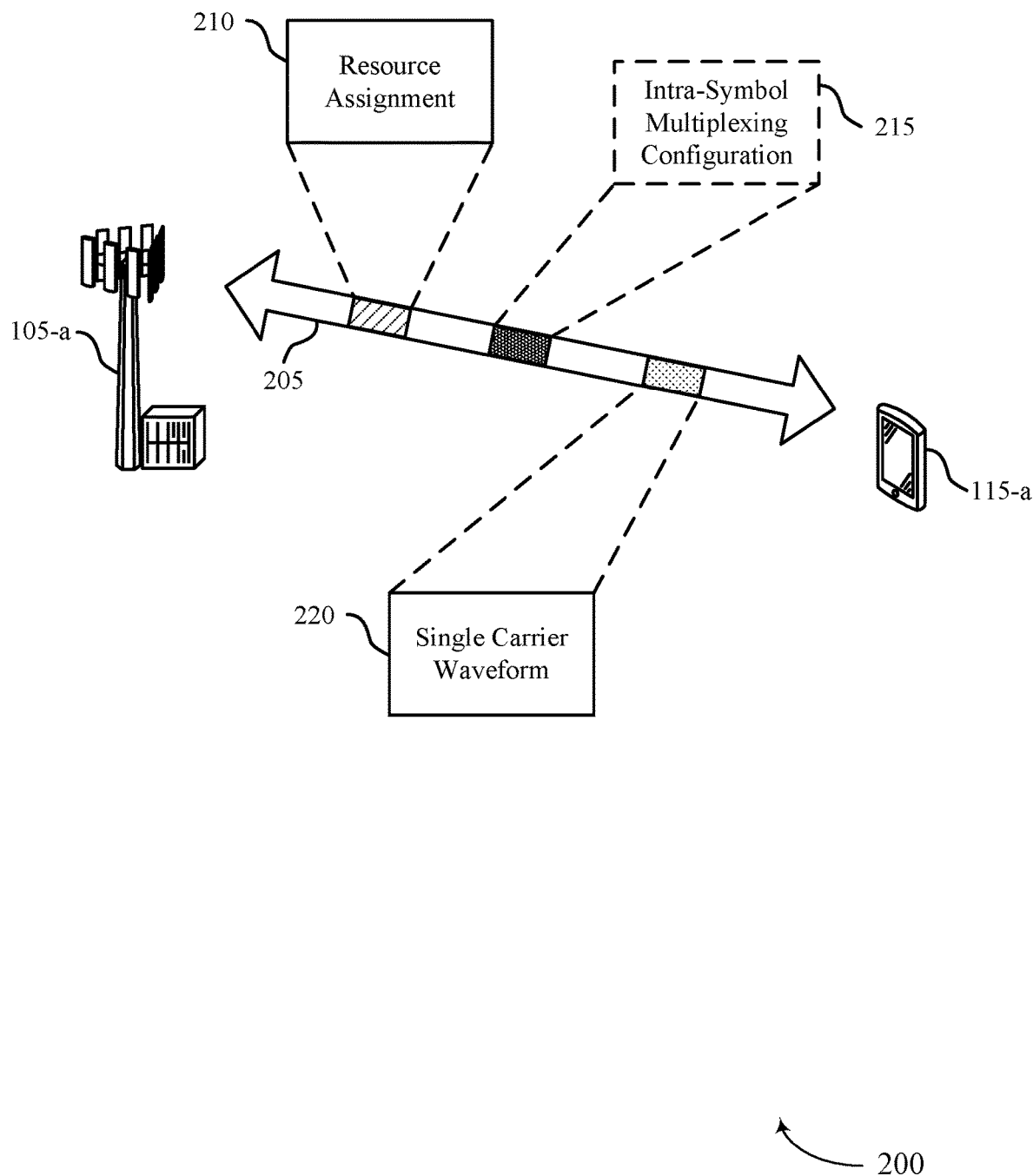
FIG. 2 illustrates an example of a wireless communications system that supports intra-symbol multiplexing with single carrier waveforms in accordance with aspects of the present disclosure.

FIG. 2 illustrates an example of a wireless communications system 200 that supports intra-symbol multiplexing with single carrier waveform in accordance with aspects of the present disclosure. In some examples, wireless communications system 200 may implement aspects of wireless communications system 100. For example, wireless communications system 200 may include a base station 105-*a* and a UE 115-*a*, which may represent examples of base stations 105 and UEs 115, respectively, as described with reference to FIG. 1. Additionally, base station 105-*a* and UE 115-*a* may communicate on resources of a carrier 205 (e.g., shared resources). While base station 105-*a* and UE 115-*a* are shown in the example of wireless communications system 200, different devices may implement the techniques described herein.

In some cases, base station 105-*a* and UE 115-*a* may support resource allocations that have high granularities. For example, as described with reference to FIG. 1, the resource allocations may be in the unit of RBs or RBGs (e.g., in the frequency domain) and OFDM/SC-FDM/SC-QAM symbols (e.g., in the time domain) for both downlink and uplink communications. Based on having this high granularity, communications between base station 105-*a* and UE 115-*a* may occur within fractions of a symbol (e.g., or a different length TTI). For example, the communications may occur using different channels within the fractions of the symbol. Additionally or alternatively, base station 105-*a* may communicate with multiple UEs 115 (e.g., including UE 115-*a*) in different fractions of the symbol. That is, a single symbol may be split into multiple fractions to enable separate transmissions for the different channels and the multiple UEs 115.

To support these communications over the different channels, with the multiple UEs 115, or a combination thereof (e.g., communicating over multiple channels with a single UE 115 and with an additional UE 115 in respective fractions of the symbol), different signals (e.g., in different fractions of the symbol) may be multiplexed together (e.g., intra-symbol multiplexing) into a single message (e.g., a single carrier waveform). However, in some cases, a first data transmission within a first fraction of a symbol may leak into a subsequent data transmission within a subsequent fraction of the symbol, causing the subsequent data transmission to be impaired or unsuccessfully transmitted. Accordingly, techniques are desired to ensure communications within a symbol do not affect other communications within the same symbol.

As described herein, for intra-symbol multiplexing of transmissions for multiple UEs 115, for different channels, or both, base station 105-*a* and UE 115-*a* (e.g., and additional UEs 115 of the multiple UEs 115) may use UE-specific or channel-specific cyclic prefixes or guard intervals in addition to any symbol level cyclic prefixes or symbol level guard intervals to increase chances that transmissions for a first channel or a first UE 115 in a first fraction of a symbol do not impact transmissions for a subsequent channel or additional UE 115 in a subsequent fraction of the symbol. For example, the cyclic prefixes, guard intervals, or both may separate different fractions of the symbol from each other, such that individual signals communicated in each of the different fractions of the symbol (e.g., intra-symbol multiplexed transmissions) may not leak into a subsequent fraction of the symbol period, or leak no more than a determined amount, to cause interference for a subsequent individual signal, or within a permitted interference level. As such, the cyclic prefixes, guard intervals, or both may enable a more reliable intra-symbol multiplexing configuration for communications between base station 105-*a* and UE 115-*a* (e.g., or two other devices).

Additionally, the intra-symbol multiplexing configurations using cyclic prefixes, guard intervals, or both (e.g., mixed cyclic prefix and guard interval operation) may avoid a constraint on any additional UE or channel-specific cyclic prefix length. The symbol level cyclic prefix may be used for the entire symbol, and additional guard intervals may be inserted for some UEs 115 or channels instead of using cyclic prefix insertion to enable the UE-specific or channel-specific frequency domain processing if needed. In some examples, the additional UE-specific or channel-specific cyclic prefixes or guard intervals may be enabled for a subset of UEs 115 or channels. Additionally, base station 105-*a* (e.g., or a different device configuring the intra-symbol multiplexing) may indicate the presence of additional UE-specific or channel-specific cyclic prefixes or guard intervals to one or more UEs 115 (e.g., including UE 115-*a*). The indication may be done in RRC or MAC-CE or in a dynamic DCI grant.

As shown, base station 105-*a* may transmit an indication of a resource assignment 210 to UE 115-*a* (e.g., and any additional UEs 115) to use for subsequent communications. In some examples, resource assignment 210 may include one or more fractions of a symbol (e.g., symbol period) allocated to UE 115-*a* for the subsequent communications with base station 105-*a*. Additionally, resource assignment 210 may include time domain and frequency domain resources to be used for the subsequent communications between UE 115-*a* and base station 105-*a*. If the subsequent communications occur over multiple channels (e.g., base station 105-*a* transmits multiple downlink channels that can be received by UE 115-*a*), resource assignment 210 may indicate corresponding fractions of the symbol for each of the multiple channels.

Subsequently, after transmitting the indication of resource assignment 210, base station 105-*a* and UE 115-*a* may identify an intra-symbol multiplexing configuration 215 for the subsequent communications. As previously described, intra-symbol multiplexing configuration 215 may include a symbol level cyclic prefix, a symbol level guard interval (e.g., occurring prior to the symbol beginning), UE-specific or channel-specific cyclic prefixes, UE-specific or channel-specific guard intervals, or a combination thereof to support the intra-symbol multiplexing of transmissions between the different fractions of the symbol. In some implementations, base station 105-*a* may determine intra-symbol multiplexing configuration 215 based on resource assignment 210 (e.g., based on a number of channels to be communicated, a number of UEs 115 that base station 105-*a* is communicating with, etc.) and may transmit an indication of intra-symbol multiplexing configuration 215 to UE 115-*a* (e.g., and to additional UEs 115). Additionally, as described previously, base station 105-*a* may transmit the indication of intra-symbol multiplexing configuration 215 via RRC signaling, a MAC CE, a dynamic DCI grant, or a different type of control message. Different variations for intra-symbol multiplexing configuration 215 are described in greater detail with reference to FIGS. 3-10.

Once intra-symbol multiplexing configuration 215 is identified by base station 105-*a* and UE 115-*a*, a single carrier waveform 220 may be communicated between the two devices. For example, single carrier waveform 220 may be an SC-QAM waveform, an OFDM waveform, an SC-FDM waveform, or a combination thereof. Additionally, single carrier waveform 220 may include multiple signals combined into a single message in accordance with intra-symbol multiplexing configuration 215. Accordingly, based on using intra-symbol multiplexing configuration 215, each of the multiple signals in single carrier waveform 220 may have a higher chance of being successfully communicated (e.g., higher reliability).

Figure 3:
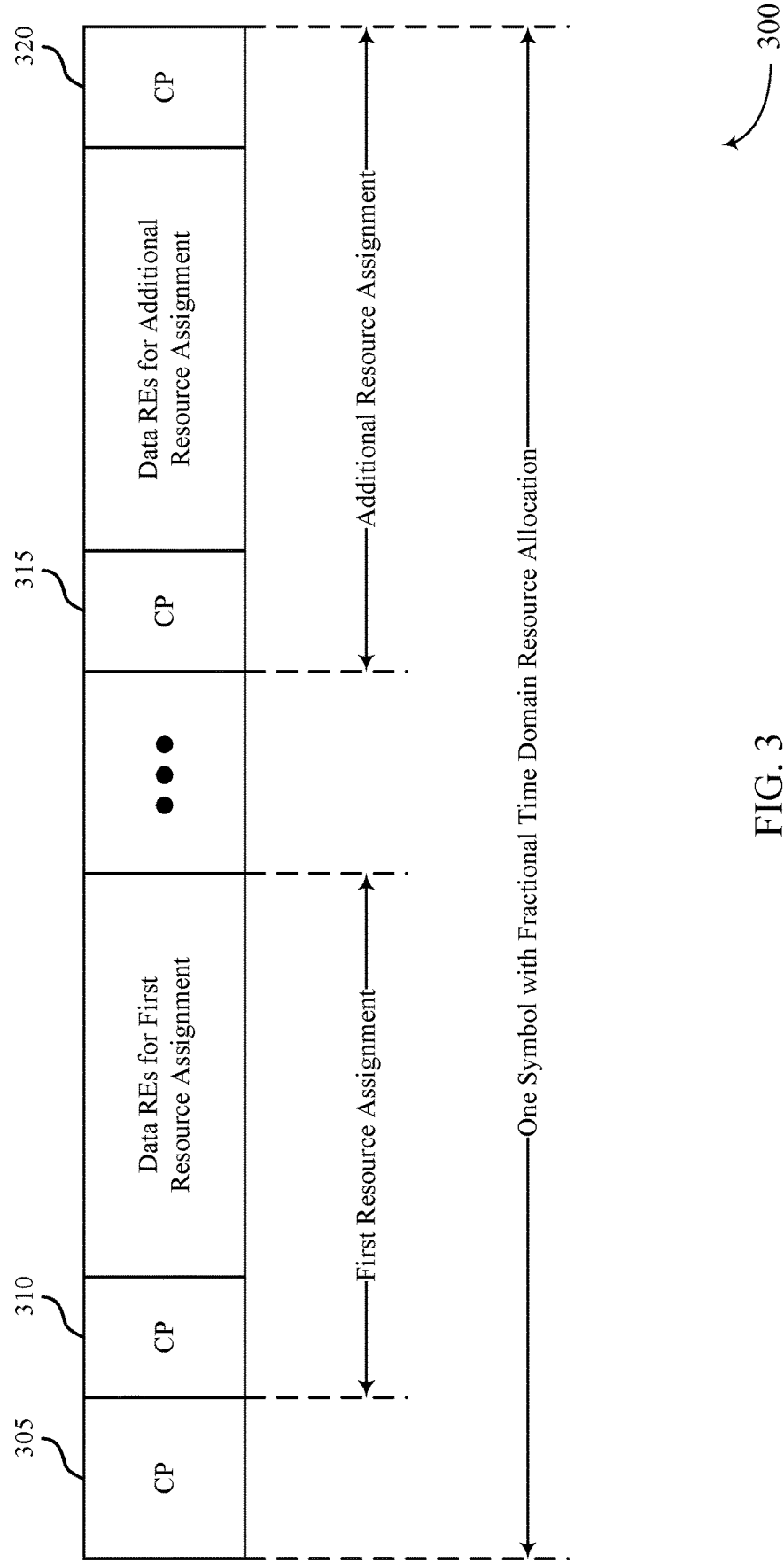
FIGS. 3-10 illustrate examples of multiplexing configurations that support intra-symbol multiplexing with single carrier waveforms in accordance with aspects of the present disclosure.

FIG. 3 illustrates an example of a multiplexing configuration 300 that supports intra-symbol multiplexing with single carrier waveform in accordance with aspects of the present disclosure. In some examples, multiplexing configuration 300 may implement aspects of wireless communications systems 100 and 200. For example, a first device (e.g., a UE 115, a base station 105, etc.) may use multiplexing configuration 300 for communications with an additional device, as described with reference to FIGS. 1 and 2. Additionally, multiplexing configuration 300 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 3, multiplexing configuration 300 may represent an intra-symbol multiplexing configuration with dedicated cyclic prefixes (CPs) for each UE or channel (e.g., UE-specific or channel-specific cyclic prefixes) with a symbol level cyclic prefix.

In some examples, multiplexing configuration 300 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data resource elements (REs) allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

Specific to multiplexing configuration 300, each resource assignment (e.g., UE or channel segment) may include a dedicated cyclic prefix in addition to a symbol level cyclic prefix. For example, multiplexing configuration 300 may include a symbol level cyclic prefix 305 for the entire symbol, a first cyclic prefix 310 specific to the first resource assignment (e.g., dedicated cyclic prefix for the first resource assignment), an additional cyclic prefix 315 specific to the additional resource assignment (e.g., dedicated cyclic prefix for the additional resource assignment), and a cyclic prefix 320 for the end of the entire symbol (e.g., corresponding to the symbol level cyclic prefix 305). In some implementations, a length for the additional cyclic prefixes (e.g., first cyclic prefix 310, additional cyclic prefix 315, and any other cyclic prefixes specific to a resource assignment for a UE or channel) may not be the same as a length for symbol level cyclic prefix 305. Additionally, a device that receives data REs in a corresponding resource assignment may take the corresponding resource assignment and may perform a small size transform (e.g., a small size discrete Fourier transform (DFT), a small size fast Fourier transform (FFT)) for frequency domain processing. In some examples, multiplexing configuration 300 may enable individual processing for each resource assignment (e.g., each fraction, each segment, etc.) with one or more additional cyclic prefixes before equalization.

Figure 4:
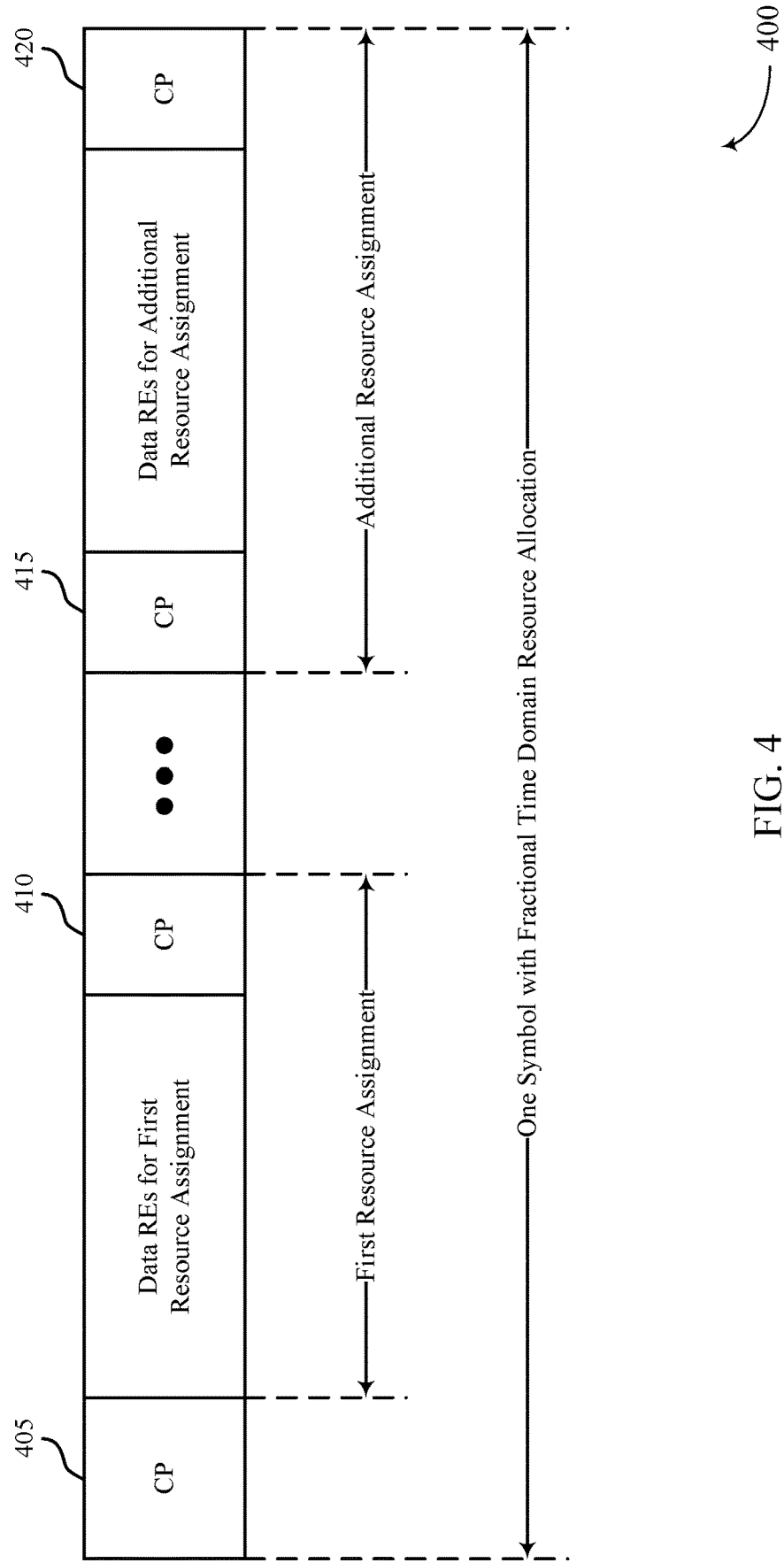

FIG. 4 illustrates an example of a multiplexing configuration 400 that supports intra-symbol multiplexing with single carrier waveform in accordance with aspects of the present disclosure. In some examples, multiplexing configuration 400 may implement aspects of wireless communications systems 100 and 200. For example, a first device (e.g., a UE 115, a base station 105, etc.) may use multiplexing configuration 400 for communications with an additional device, as described with reference to FIGS. 1 and 2. Additionally, multiplexing configuration 400 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 4, multiplexing configuration 400 may represent an intra-symbol multiplexing configuration with dedicated cyclic prefixes (CPs) for each UE or channel without a symbol level cyclic prefix.

In some examples, multiplexing configuration 400 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

Multiplexing configuration 400 may not include a symbol level cyclic prefix as discussed with reference to FIG. 3 based on the single waveform used for carrying each resource assignment. For example, if the single waveform is an SC-QAM waveform, a symbol level cyclic prefix may not be required as there is no FDM with an SC-QAM waveform for user (e.g., UEs 115) or channel multiplexing within a BWP. Accordingly, for multiplexing configuration 400, no symbol level cyclic prefix may be used, but dedicated cyclic prefixes may be used for each resource assignment. For example, the first resource assignment may include a first cyclic prefix 405 and a corresponding cyclic prefix 410 at the end of the first resource assignment (e.g., dedicated cyclic prefixes for the first resource assignment), and the additional resource assignment may include an additional cyclic prefix 415 and a corresponding cyclic prefix 420 at the end of the additional resource assignment (e.g., dedicated cyclic prefixes for the additional resource assignment).

Figure 5:
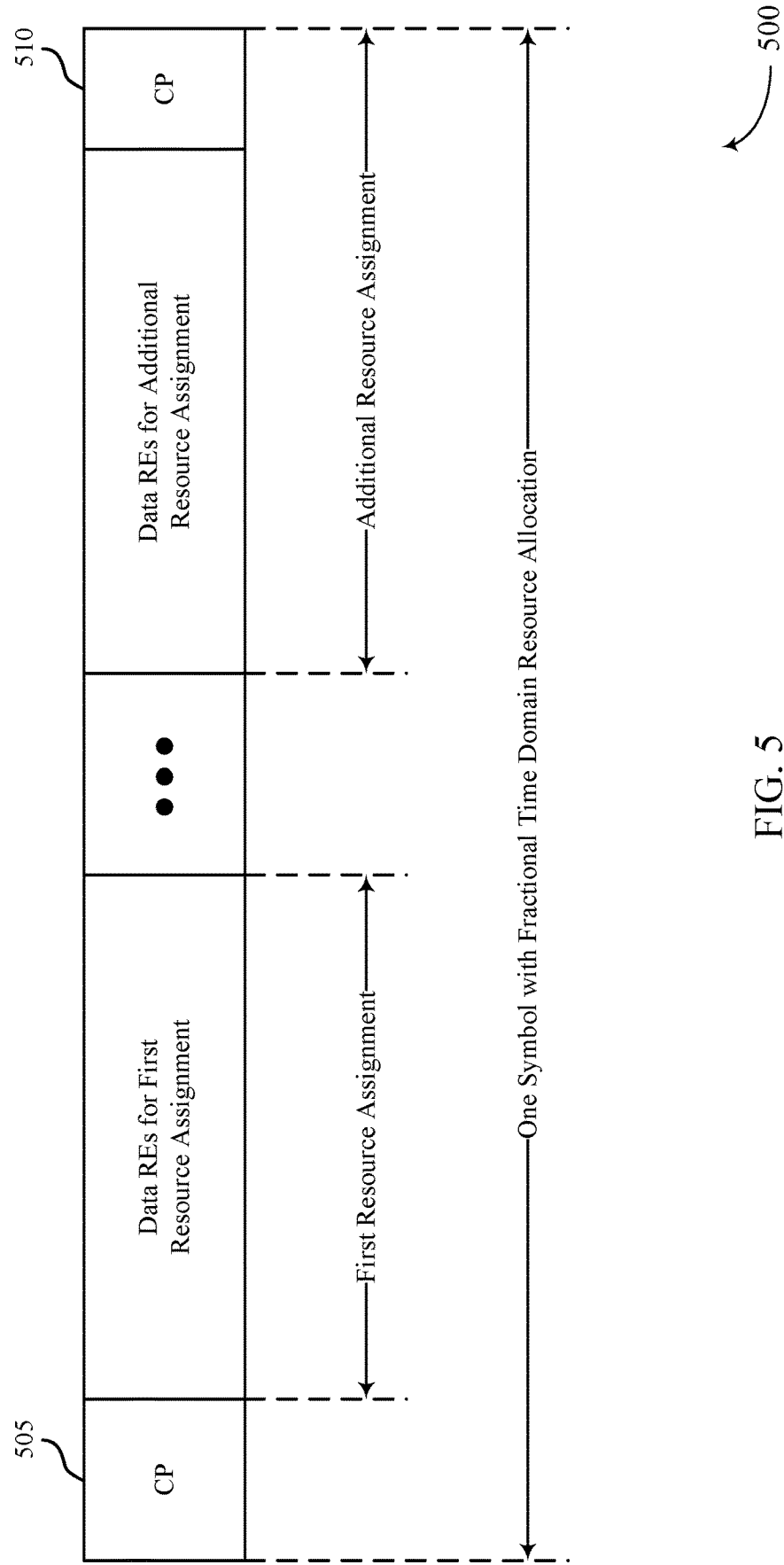

FIG. 5 illustrates an example of a multiplexing configuration 500 that supports intra-symbol multiplexing with single carrier waveform in accordance with aspects of the present disclosure. In some examples, multiplexing configuration 500 may implement aspects of wireless communications systems 100 and 200. For example, a first device (e.g., a UE 115, a base station 105, etc.) may use multiplexing configuration 500 for communications with an additional device, as described with reference to FIGS. 1 and 2. Additionally, multiplexing configuration 500 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 5, multiplexing configuration 500 may represent an intra-symbol multiplexing configuration with no dedicated cyclic prefixes (CPs) for each UE or channel but may include a symbol level cyclic prefix.

In some examples, multiplexing configuration 500 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

In multiplexing configuration 500, there may not be dedicated cyclic prefixes for each resource assignment (e.g., each UE or channel segment). Instead, multiplexing configuration 500 may include a symbol level cyclic prefix 505 at the beginning of the symbol and a corresponding cyclic prefix 510 at the end of the symbol. A device receiving data REs for a corresponding resource assignment may perform (frequency domain) equalization for the entire symbol and then may take a corresponding resource assignment (e.g., segment) after equalization. Devices may use multiplexing configuration 500 when the channel estimation is available and is the same for all the resource assignments (e.g., segments, fractions, etc.) within the symbol.

Figure 6:
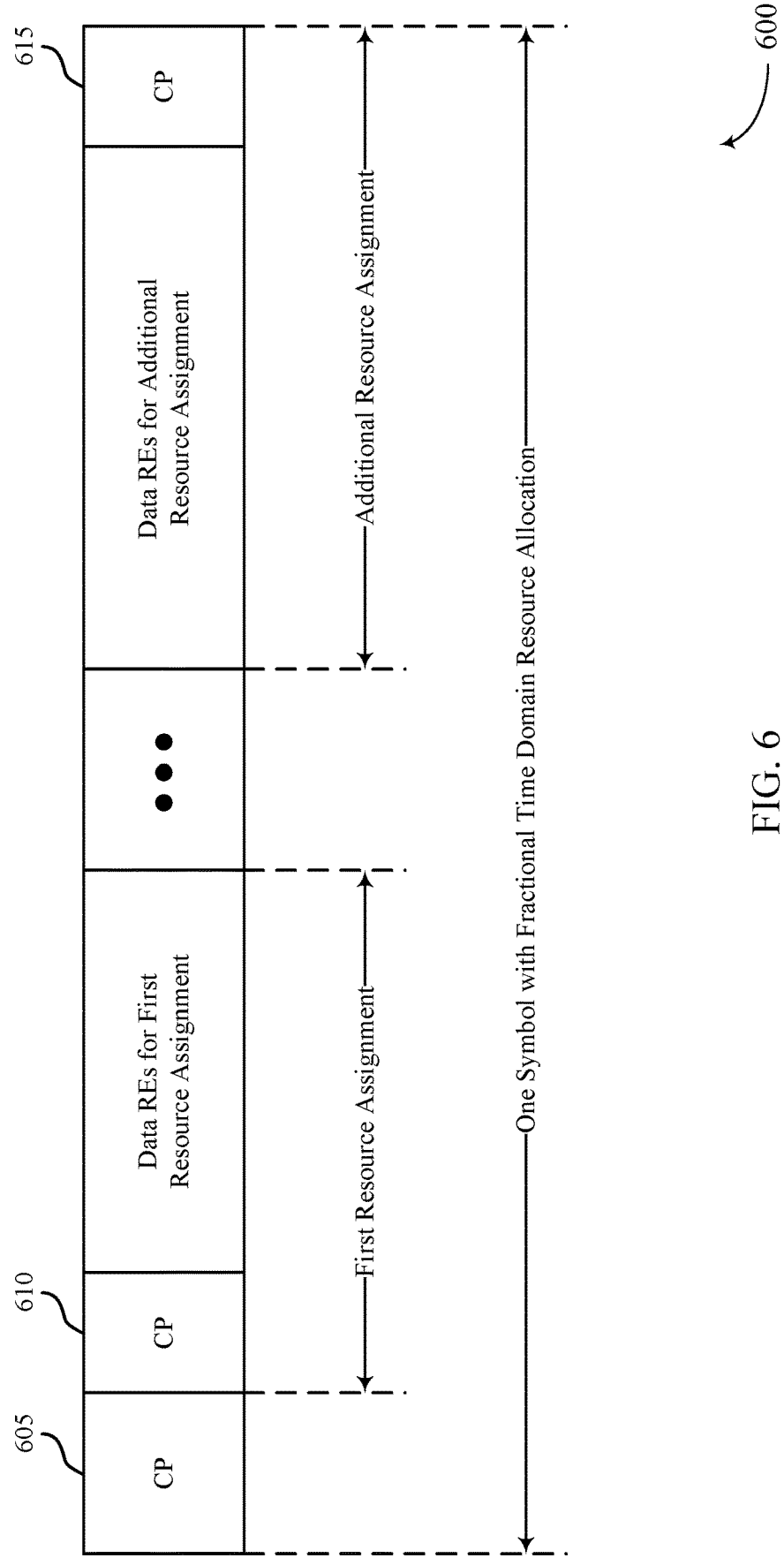

FIG. 6 illustrates an example of a multiplexing configuration 600 that supports intra-symbol multiplexing with single carrier waveform in accordance with aspects of the present disclosure. In some examples, multiplexing configuration 600 may implement aspects of wireless communications systems 100 and 200. For example, a first device (e.g., a UE 115, a base station 105, etc.) may use multiplexing configuration 600 for communications with an additional device, as described with reference to FIGS. 1 and 2. Additionally, multiplexing configuration 600 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 6, multiplexing configuration 600 may represent an intra-symbol multiplexing configuration with dedicated cyclic prefixes (CPs) for a subset of UEs or channels with a symbol level cyclic prefix.

In some examples, multiplexing configuration 600 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

Multiplexing configuration 600 may include a symbol level cyclic prefix 605 for the entire symbol (e.g., with a corresponding cyclic prefix 615 at the end of the symbol) and one or more additional cyclic prefixes for some of the resource assignments for specific UEs or channels. For example, the first resource assignment may include a first cyclic prefix 610 (e.g., dedicated cyclic prefix for the first resource assignment), but the additional resource assignment may not include a dedicated cyclic prefix. In some examples, some UEs 115 or channels may require de-multiplexing before equalization and, hence, may require a dedicated cyclic prefix. Additionally or alternatively, some UEs 115 or channels may perform de-multiplexing after equalization and, hence, may not require dedicated cyclic prefixes. In some examples, some UEs 115 or channels tolerate inter-symbol interference across different resource assignments (e.g., fractions of the symbol) and, hence, may not require the dedicated cyclic prefixes. This ability to operate with inter-symbol interference may occur if one UE 115 or channel occupies significant time domain REs, and, hence, the cross UE 115 or channel interference may be negligible or tolerable. Additionally, some UEs 115 or channels may occupy few time domain REs, and the additional cyclic prefix overhead may introduce more loss compared to cross UE or channel interference.

Figure 7:
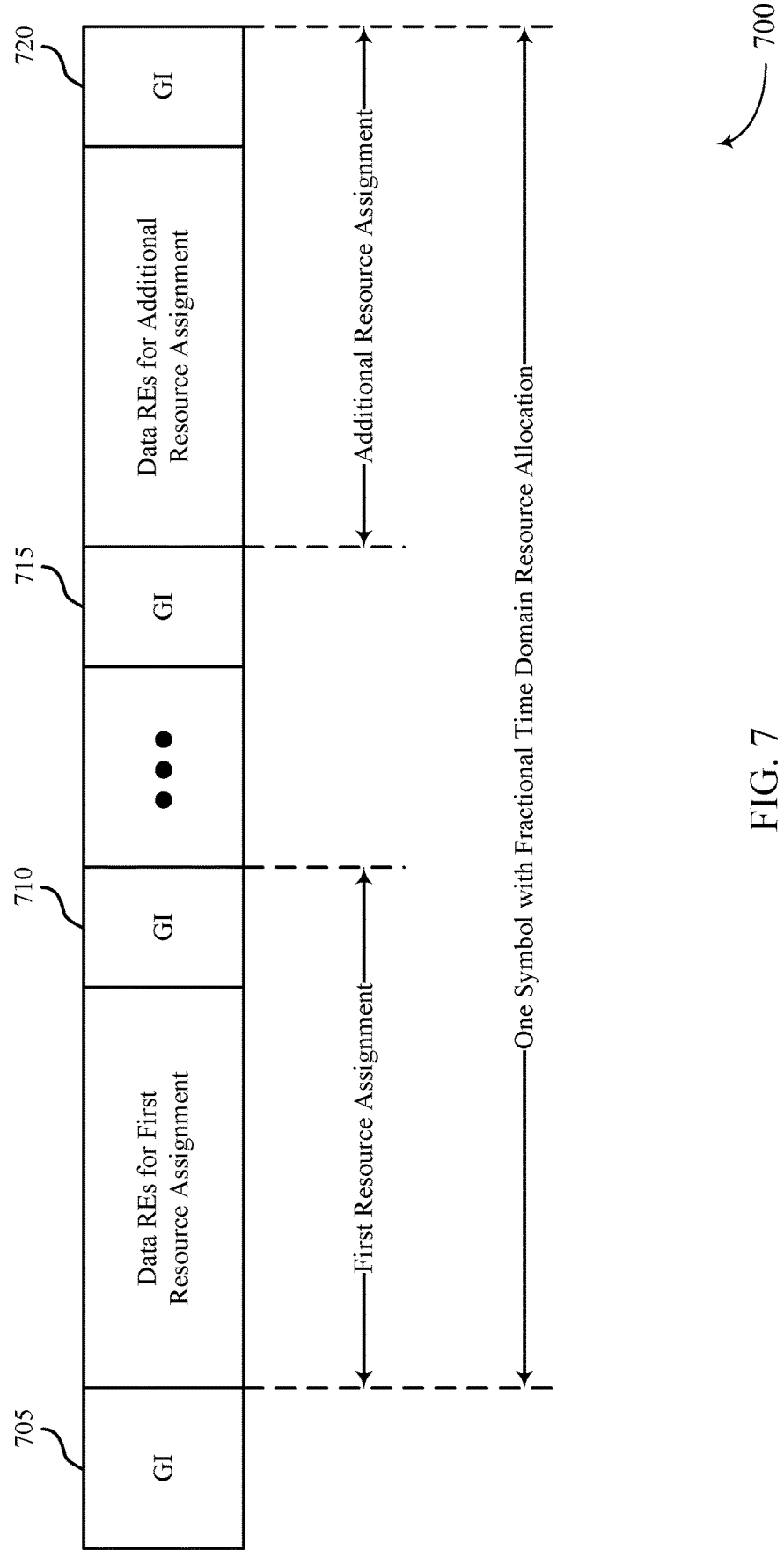

FIG. 7 illustrates an example of a multiplexing configuration 700 that supports intra-symbol multiplexing with single carrier waveform in accordance with aspects of the present disclosure. In some examples, multiplexing configuration 700 may implement aspects of wireless communications systems 100 and 200. For example, a first device (e.g., a UE 115, a base station 105, etc.) may use multiplexing configuration 700 for communications with an additional device, as described with reference to FIGS. 1 and 2. Additionally, multiplexing configuration 700 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 7, multiplexing configuration 700 may represent an intra-symbol multiplexing configuration with dedicated guard intervals (GIs) for each UE or channel with a symbol level guard interval.

In some examples, multiplexing configuration 700 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

Multiplexing configuration 700 may include each resource assignment (e.g., UE or channel segment) with a corresponding dedicated guard interval in addition to a symbol level guard interval. For example, multiplexing configuration 700 may include a symbol level guard interval 705 that occurs prior to the symbol beginning, a first guard interval 710 corresponding to the first resource assignment (e.g., dedicated guard interval for the first resource assignment), a guard interval 715 prior to the beginning of the additional resource assignment, and an additional guard interval 720 at the end of the symbol. In some examples, the additional guard interval 720 may not be dedicated to the additional resource assignment but instead may be present based on guard intervals occurring at the end of a symbol prior to a subsequent symbol beginning (e.g., similar to the presence of symbol level guard interval 705 prior to the shown symbol beginning). Additionally, a device that receives data REs in a corresponding resource assignment may take the corresponding resource assignment and may perform a small size transform (e.g., a small size DFT, a small size FFT) for (frequency domain) processing. In some examples, multiplexing configuration 700 may enable individual processing for each resource assignment (e.g., each fraction, each segment, etc.) with one or more additional guard intervals before equalization.

Figure 8:
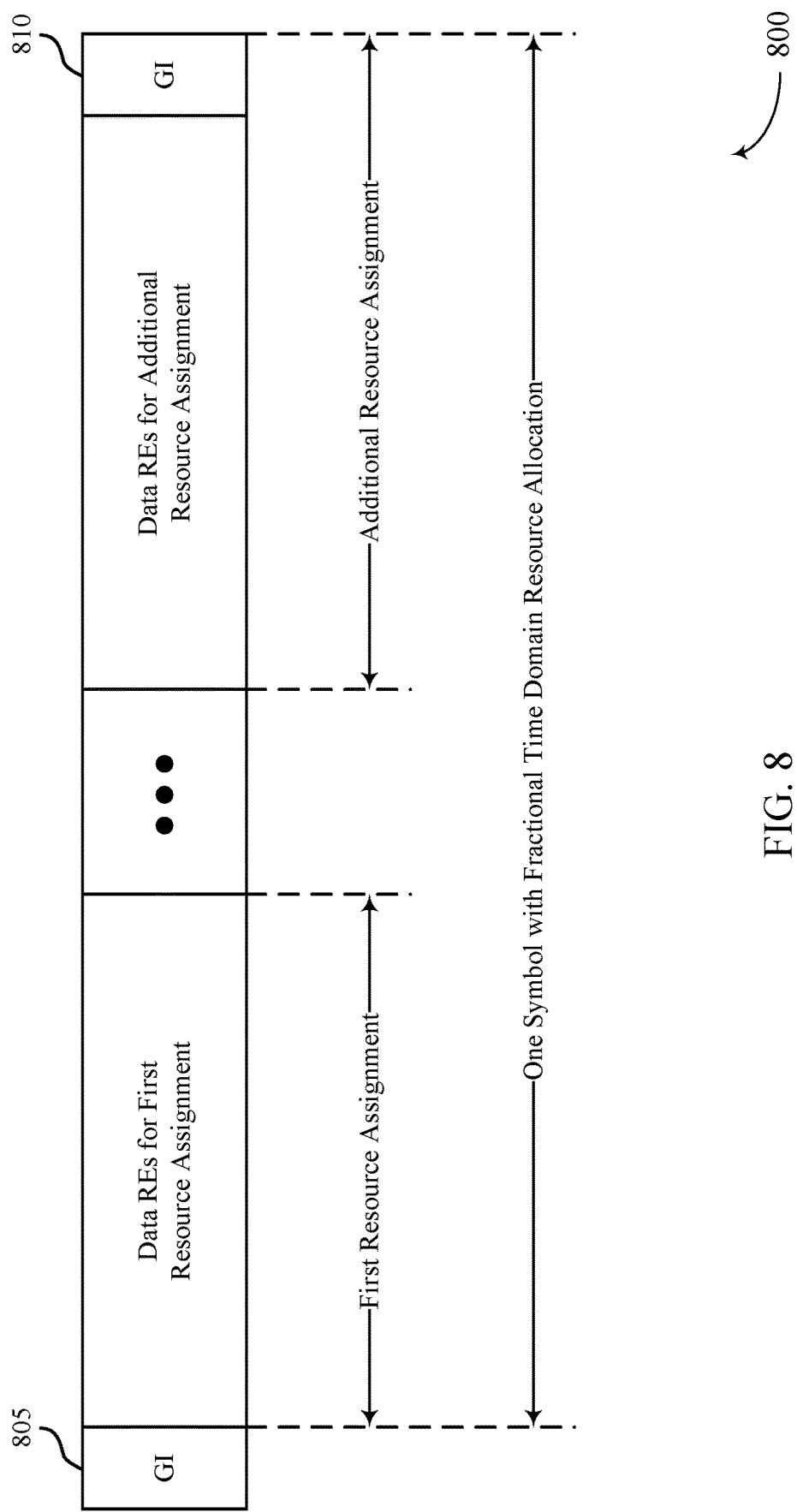

FIG. 8 illustrates an example of a multiplexing configuration 800 that supports intra-symbol multiplexing with single carrier waveform in accordance with aspects of the present disclosure. In some examples, multiplexing configuration 800 may implement aspects of wireless communications systems 100 and 200. For example, a first device (e.g., a UE 115, a base station 105, etc.) may use multiplexing configuration 800 for communications with an additional device, as described with reference to FIGS. 1 and 2. Additionally, multiplexing configuration 800 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 8, multiplexing configuration 800 may represent an intra-symbol multiplexing configuration with no dedicated guard intervals for each UE or channel.

In some examples, multiplexing configuration 800 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

Multiplexing configuration 800 may not include dedicated guard intervals for each of the resource assignments but may include a symbol level guard interval for the entire symbol. For example, multiplexing configuration 800 may include a symbol level guard interval 805 that occurs prior to the beginning of the symbol and another symbol level guard interval 810 at the end of the symbol prior to the start of a subsequent symbol. In some examples, the different resource assignments (e.g., for the different UEs 115 or different channels) may be separated after (frequency domain) equalization.

Figure 9:
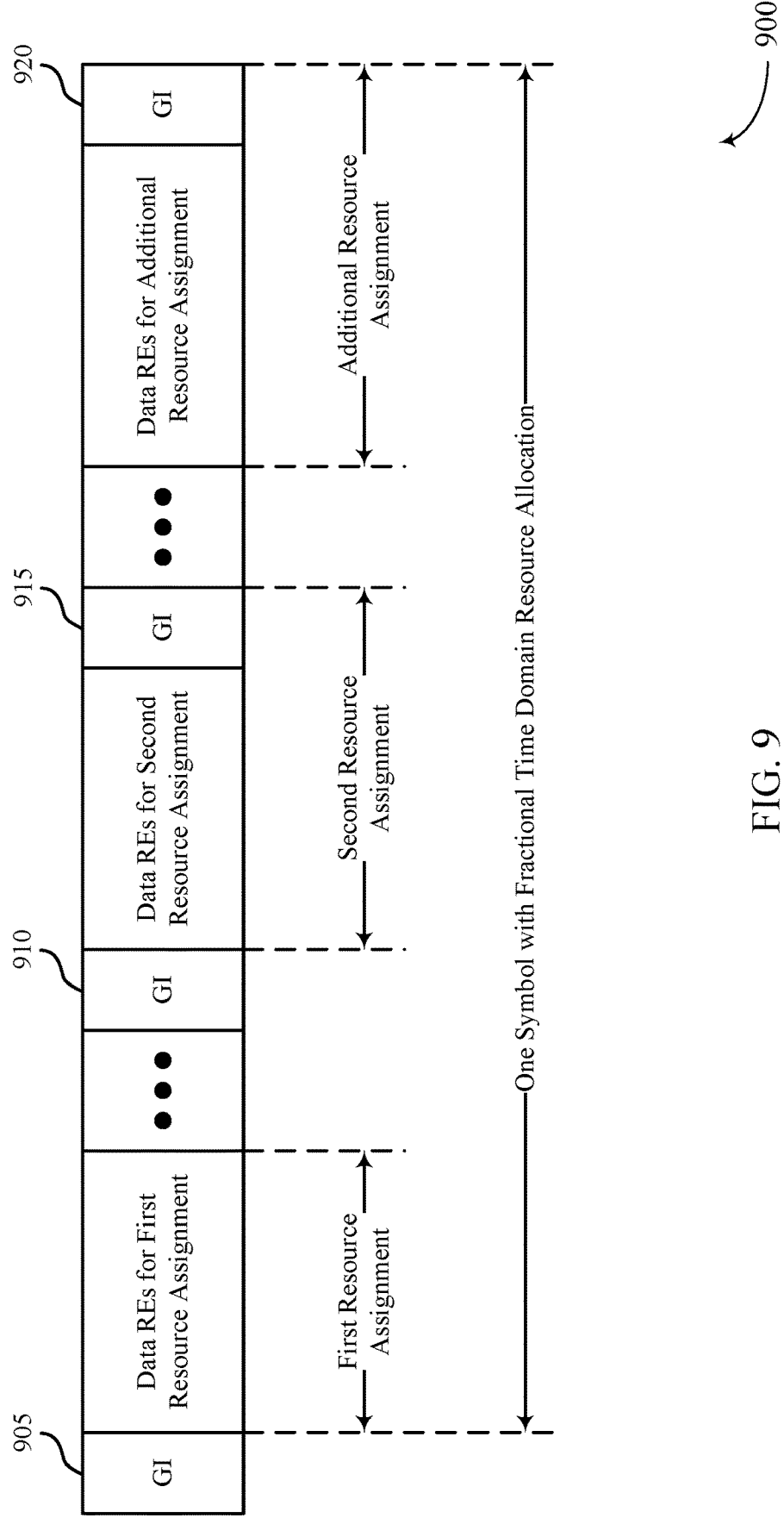

FIG. 9 illustrates an example of a multiplexing configuration 900 that supports intra-symbol multiplexing with single carrier waveform in accordance with aspects of the present disclosure. In some examples, multiplexing configuration 900 may implement aspects of wireless communications systems 100 and 200. For example, a first device (e.g., a UE 115, a base station 105, etc.) may use multiplexing configuration 900 for communications with an additional device, as described with reference to FIGS. 1 and 2. Additionally, multiplexing configuration 900 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 9, multiplexing configuration 900 may represent an intra-symbol multiplexing configuration with dedicated guard intervals for some UEs or channels with a symbol level guard interval.

In some examples, multiplexing configuration 900 may be used for one symbol with a fractional time domain resource allocation. For example, the one symbol may be divided into multiple fractional time domain resource assignments, such as a first resource assignment, a second resource assignment, and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

Multiplexing configuration 900 may include a symbol level guard interval with one or more additional guard intervals for some UEs 115 or channels (e.g., for corresponding resource assignments). For example, multiplexing configuration 900 may include a symbol level guard interval 905 that occurs prior to the start of the symbol and an additional guard interval 920 that occurs at the end of the symbol prior to a start of a subsequent symbol. Additionally, as shown in the example of FIG. 9, the second resource assignment (e.g., for a corresponding UE 115 or for a corresponding channel) may include a first guard interval 910 and a second guard interval 915 (e.g., two additional guard intervals) for separate processing before symbol level equalization.

In some examples, to maintain a uniform DFT or FFT size, a time domain resource allocation for a UE 115 or channel that has communications on the data REs for the second resource assignment may include one of the guard intervals, while the other guard interval overhead is absorbed in adjacent resource assignments (e.g., either an earlier resource assignment occurring right before the second resource assignment or a later resource assignment right after the second resource assignment). For example, the second resource assignment may be configured with the first guard interval 910, where the second guard interval 915 is configured for an immediately subsequent resource assignment after the second resource assignment. Alternatively, the second resource assignment may be configured with the second guard interval 915, and the first guard interval 910 is configured for an immediately preceding resource assignment before the second resource assignment.

Figure 10:
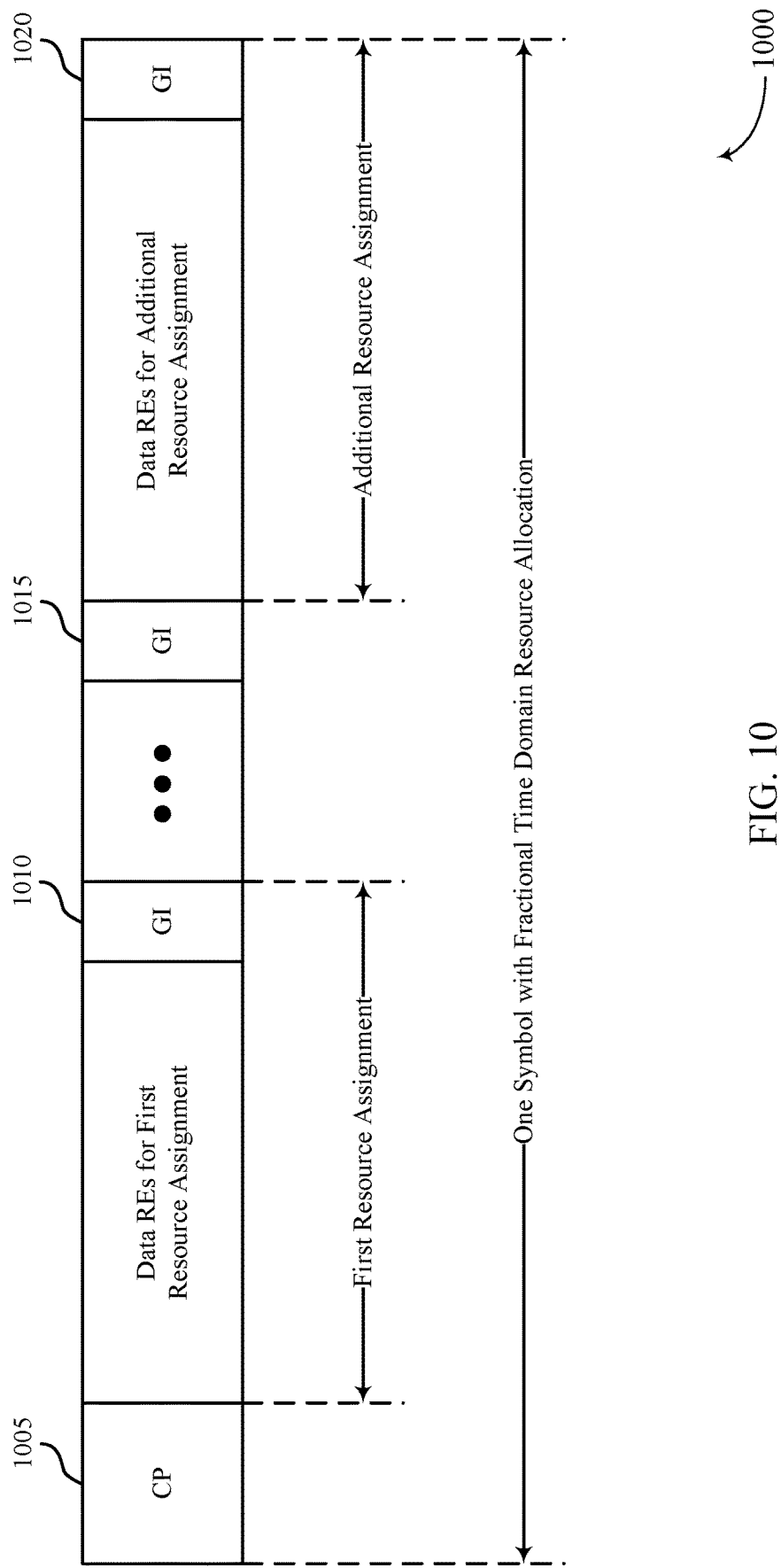

FIG. 10 illustrates an example of a multiplexing configuration 1000 that supports intra-symbol multiplexing with single carrier waveform in accordance with aspects of the present disclosure. In some examples, multiplexing configuration 1000 may implement aspects of wireless communications systems 100 and 200. For example, a first device (e.g., a UE 115, a base station 105, etc.) may use multiplexing configuration 1000 for communications with an additional device, as described with reference to FIGS. 1 and 2. Additionally, multiplexing configuration 1000 may be used to support an intra-symbol multiplexing operation as described herein, where one or more of a symbol level cyclic prefix, a symbol level guard interval, UE-specific or channel-specific cyclic prefixes, and UE-specific or channel-specific guard intervals are used to enable the intra-symbol multiplexing operation as described with reference to FIG. 2. In the example of FIG. 10, multiplexing configuration 1000 may represent an intra-symbol multiplexing configuration with a mixed cyclic prefix and guard interval operation with intra-symbol multiplexing.

In some examples, multiplexing configuration 1000 may be used for one symbol with a fractional time domain resource allocation. For example, the one symbol may be divided into multiple fractional time domain resource assignments, such as a first resource assignment and an additional resource assignment. Each resource assignment may be configured for a specific UE 115 or for a specific channel. For example, each resource assignment may at least include a set of data REs allocated for communications using the corresponding resource assignment (e.g., for the specific UE 115 or for the specific channel). While each of the sets of data REs may be specific to the corresponding resource assignment, a single waveform may be used to carry all the sets of data REs together in a single message (e.g., as part of the intra-symbol multiplexing). For example, the single waveform may include a single carrier waveform as described with reference to FIG. 2, such as an SC-QAM waveform, an OFDM waveform, an SC-FDM waveform, or a similar waveform.

In the variations for the intra-symbol multiplexing as shown in FIGS. 3, 4, and 6, dedicated cyclic prefixes for corresponding resource assignments may be added for some of the UEs 115 or channels. However, to support efficient DFT or FFT operation, the use of the dedicated cyclic prefixes may place a constraint on the dedicated cyclic prefix length, which may further affect an associated overhead or a corresponding delay spread of the channel for frequency domain processing.

Multiplexing configuration 1000 may use a mixed cyclic prefix and guard interval operation to avoid the constraint on the dedicated cyclic prefix length. For example, multiplexing configuration 1000 may include a symbol level cyclic prefix 1005 that is used for the entire symbol. Additionally, multiplexing configuration 1000 may include a guard interval 1010 dedicated to the first resource assignment, a guard interval 1015 prior to the beginning of the additional resource assignment (e.g., either as a dedicated guard interval for the additional resource assignment or for a preceding resource assignment immediately before the additional resource assignment), and a guard interval 1020 (e.g., either as a dedicated guard interval for the additional resource assignment or as a guard interval at the end of the symbol). To enable the UE or channel specific frequency domain processing, the additional guard intervals may be inserted for some UEs 115 or channels instead of using cyclic prefix insertion.

Figure 11:
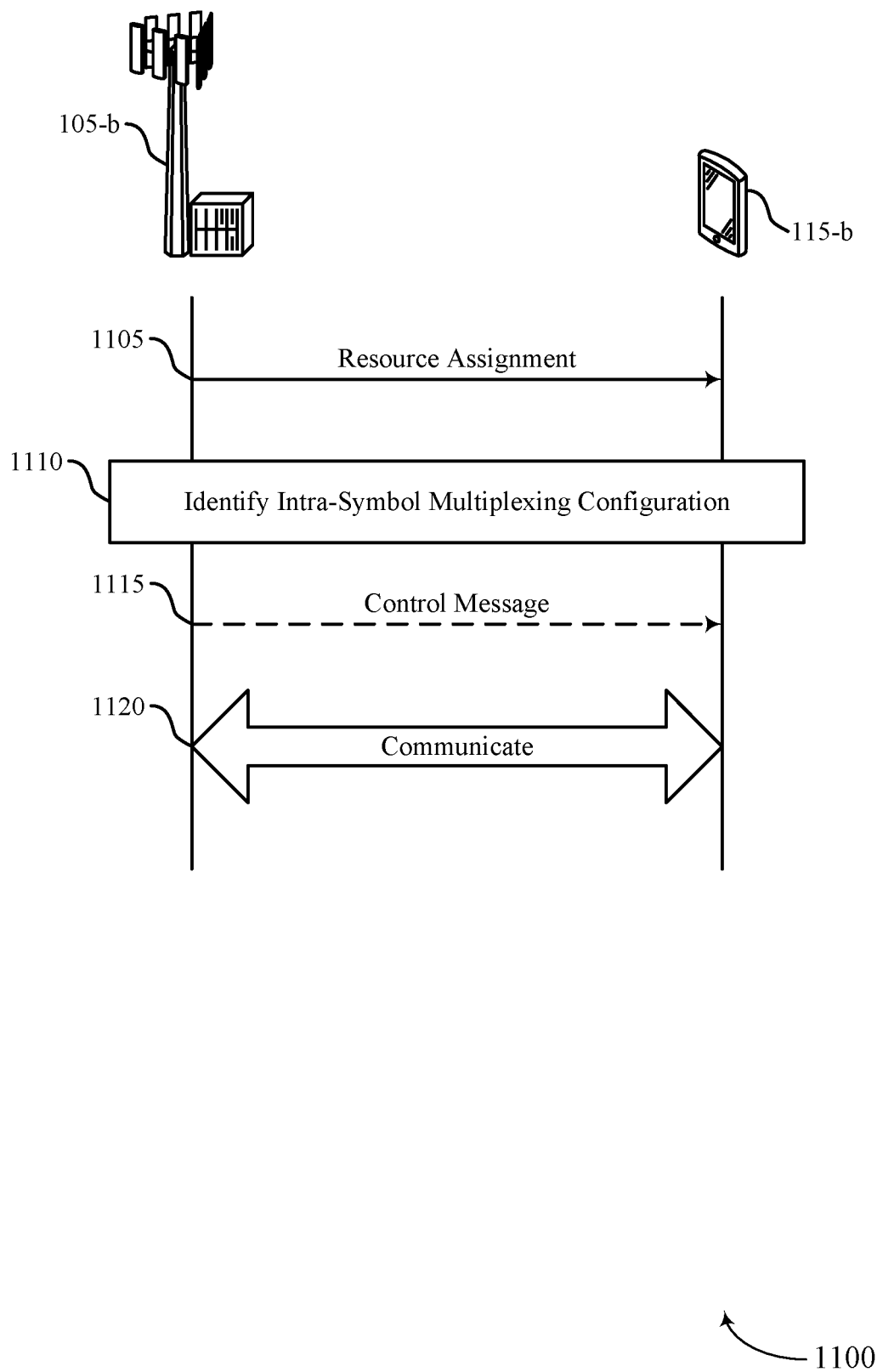
FIG. 11 illustrates an example of a process flow that supports intra-symbol multiplexing with single carrier waveforms in accordance with aspects of the present disclosure.

FIG. 11 illustrates an example of a process flow 1100 that supports intra-symbol multiplexing with single carrier waveform in accordance with aspects of the present disclosure. In some examples, process flow 1100 may implement aspects of wireless communications systems 100 and 200. For example, process flow 1100 may be implemented by a base station 105-*b*, a UE 115-*b*, or both, which may represent examples of corresponding base stations 105 and UEs 115, respectively, as described with reference to FIGS. 1-10.

In the following description of process flow 1100, the operations between base station 105-*b* and UE 115-*b* may be transmitted in a different order than the exemplary order shown, or the operations performed by base station 105-*b* and UE 115-*b* may be performed in different orders or at different times. Certain operations may also be left out of process flow 1100, or other operations may be added to process flow 1100. It is to be understood that while base station 105-*b* and UE 115-*b* are shown performing a number of the operations of process flow 1100, any wireless device may perform the operations shown.

At 1105, UE 115-*b* may receive, from base station 105-*b*, a time domain resource assignment allocating a fraction of a symbol period for communications with base station 105-*b*. In some examples, base station 105-*b* may transmit a set of time domain resource assignments to one or more UEs 115 (e.g., including UE 115-*b*) that allocate respective fractions of the symbol period to the one or more UEs 115, or allocate respective fractions of the symbol period to one or more UEs 115, or any combination thereof.

At 1110, UE 115-*b* and base station 105-*b* may identify an intra-symbol multiplexing configuration for the symbol period based on the time domain resource assignment. In some examples, base station 105-*b* may identify the intra-symbol multiplexing configuration for the symbol period based on the set of time domain resource assignments. Examples of the intra-symbol multiplexing configurations are depicted in FIGS. 3-10 and discussed herein.

At 1115, UE 115-*b* may receive, from base station 105-*b*, a control message indicating the intra-symbol multiplexing configuration. In some examples, base station 105-*b* may transmit the control message to the one or more UEs 115 via RRC signaling, a MAC CE, a dynamic DCI grant, additional signaling, or a combination thereof.

At 1120, base station 105-*b* may communicate a single carrier waveform with UE 115-*b* (e.g., and any additional UEs 115 of the one or more UEs 115) within the symbol period in accordance with the intra-symbol multiplexing configuration and the (set of) time domain resource assignment(s). For example, UE 115-*b* and base station 105-*b* may communicate the single carrier waveform within the symbol period including a symbol level cyclic prefix and a cyclic prefix within a resource of the time domain resource assignment (e.g., respective dedicated cyclic prefixes within each resource assignment of the set of time domain resource assignments), as described with reference to FIG. 3. In some other examples, UE 115-*b* and base station 105-*b* may communicate the single carrier waveform within the symbol period including a cyclic prefix preceding a resource of the time domain resource assignment (e.g., respective dedicated cyclic prefixes within each resource assignment of the set of time domain resource assignments), as described with reference to FIG. 4. In some other examples, UE 115-*b* and base station 105-*b* may communicate the single carrier waveform within the symbol period including a symbol level cyclic prefix for the symbol period (e.g., a symbol level cyclic prefix prior to a beginning resource assignment of the set of time domain resource assignments), as described with reference to FIG. 5.

In some other examples, UE 115-*b* and base station 105-*b* may communicate the single carrier waveform within the symbol period including a guard interval corresponding to a resource of the time domain resource assignment (e.g., respective dedicated guard intervals within each resource assignment of the set of time domain resource assignments), where an additional guard interval occurs in a second symbol period preceding the symbol period (e.g., symbol level guard interval), as described with reference to FIG. 7. In some other examples, UE 115-*b* and base station 105-*b* may communicate the single carrier waveform within the symbol period based on a guard interval occurring in a second symbol period preceding the symbol period (e.g., symbol level guard interval), as described with reference to FIG. 8. In some other examples, UE 115-*b* and base station 105-*b* may communicate the single carrier waveform within the symbol period including a symbol level cyclic prefix and a guard interval corresponding to a resource of the time domain resource assignment (e.g., respective dedicated guard intervals within each resource assignment of the set of time domain resource assignments), as described with reference to FIG. 10.

In some implementations, the resource assignment may be one of a set of time domain resource assignments allocating a set of channels within the symbol period. Accordingly, UE 115-b and base station 105-b may communicate the single carrier waveform within the symbol period including a symbol level cyclic prefix and a cyclic prefix within at least one resource of the set of time domain resource assignments (e.g., dedicated cyclic prefixes for some UEs 115 or channels), as described with reference to FIG. 6. Additionally or alternatively, UE 115-b and base station 105-b may communicate the single carrier waveform within the symbol period including a guard interval for at least one resource of the set of time domain resource assignments (e.g., dedicated guard intervals for some UEs 115 or channels), where an additional guard interval occurs in a second symbol period preceding the symbol period (e.g., symbol level guard interval), as described with reference to FIG. 9.

Figure 12:
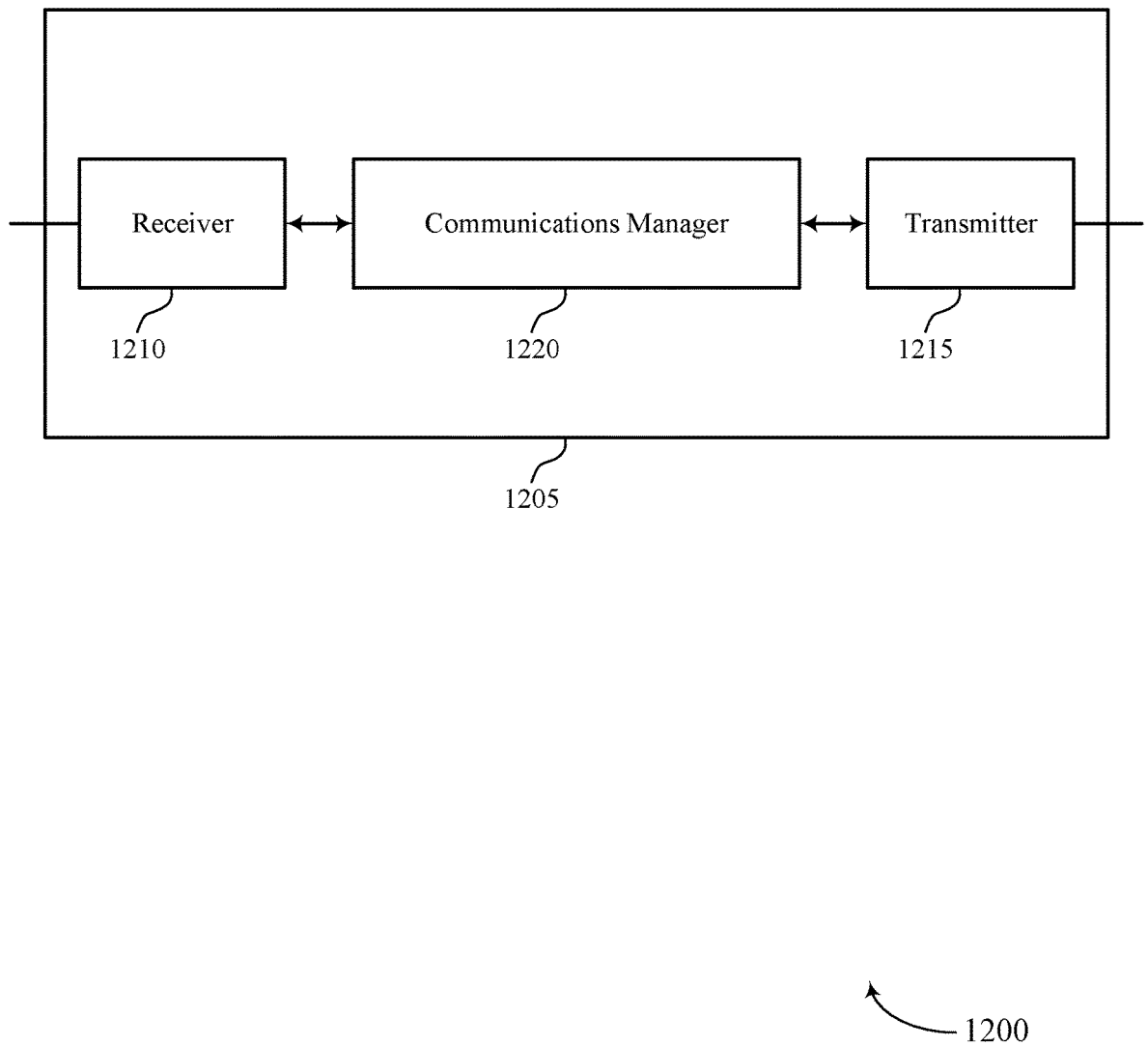
FIGS. 12 and 13 show block diagrams of devices that support intra-symbol multiplexing with single carrier waveforms in accordance with aspects of the present disclosure.

FIG. 12 shows a block diagram 1200 of a device 1205 that supports intra-symbol multiplexing with single carrier waveforms in accordance with aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to intra-symbol multiplexing with single carrier waveforms). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to intra-symbol multiplexing with single carrier waveforms). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of intra-symbol multiplexing with single carrier waveforms as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a UE in accordance with examples as disclosed herein. For example, the communications manager 1220 may be configured as or otherwise support a means for receiving, from a base station, a time domain resource assignment allocating a fraction of a symbol period for communications with the base station. The communications manager 1220 may be configured as or otherwise support a means for identifying an intra-symbol multiplexing configuration for the symbol period based on the time domain resource assignment. The communications manager 1220 may be configured as or otherwise support a means for communicating, with the base station, a single carrier waveform within the symbol period in accordance with the intra-symbol multiplexing configuration and the time domain resource assignment.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and more efficient utilization of communication resources. For example, the intra-symbol multiplexing configuration may enable multiple signals to be transmitted within a same message on the same set of time and frequency resources. Additionally, using the single carrier waveform may reduce processing of a transmitting device and a receiving device of the single carrier waveform based on having one waveform to process rather than processing individual waveforms specific for different channels or devices.

Figure 13:
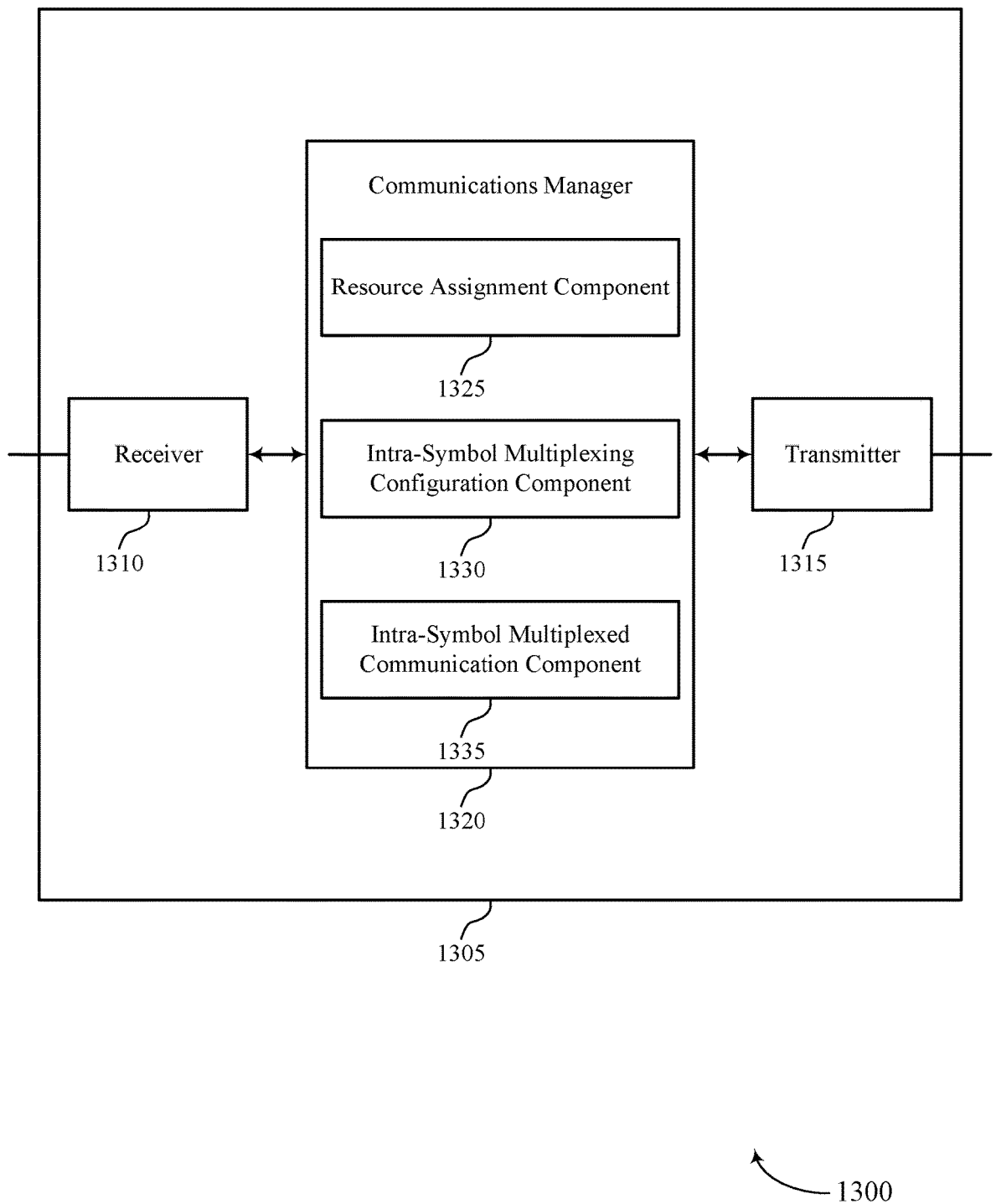

FIG. 13 shows a block diagram 1300 of a device 1305 that supports intra-symbol multiplexing with single carrier waveforms in accordance with aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to intra-symbol multiplexing with single carrier waveforms). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to intra-symbol multiplexing with single carrier waveforms). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of intra-symbol multiplexing with single carrier waveforms as described herein. For example, the communications manager 1320 may include a resource assignment component 1325, an intra-symbol multiplexing configuration component 1330, an intra-symbol multiplexed communication component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a UE in accordance with examples as disclosed herein. The resource assignment component 1325 may be configured as or otherwise support a means for receiving, from a base station, a time domain resource assignment allocating a fraction of a symbol period for communications with the base station. The intra-symbol multiplexing configuration component 1330 may be configured as or otherwise support a means for identifying an intra-symbol multiplexing configuration for the symbol period based on the time domain resource assignment. The intra-symbol multiplexed communication component 1335 may be configured as or otherwise support a means for communicating, with the base station, a single carrier waveform within the symbol period in accordance with the intra-symbol multiplexing configuration and the time domain resource assignment.

Figure 14:
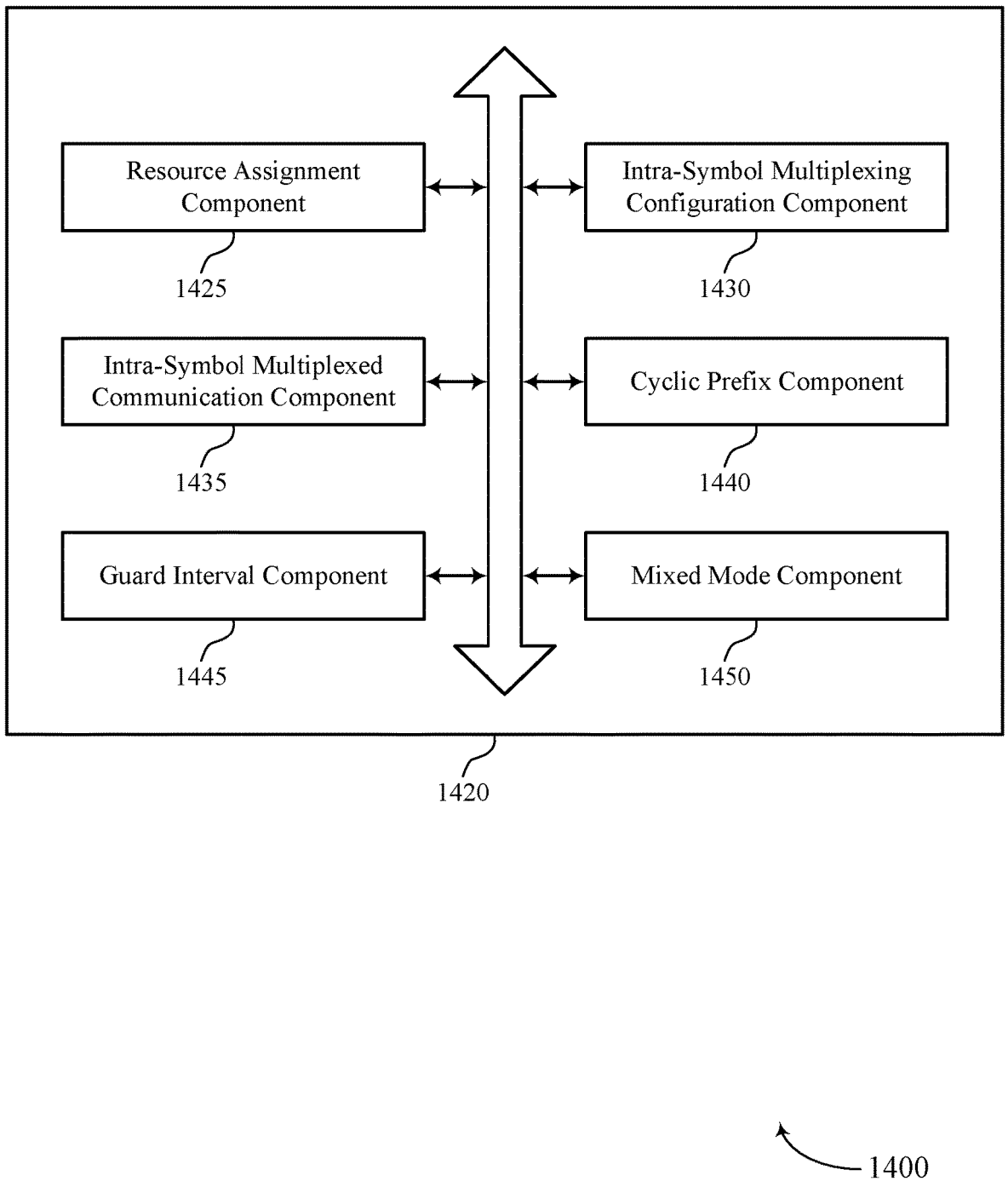
FIG. 14 shows a block diagram of a communications manager that supports intra-symbol multiplexing with single carrier waveforms in accordance with aspects of the present disclosure.

FIG. 14 shows a block diagram 1400 of a communications manager 1420 that supports intra-symbol multiplexing with single carrier waveforms in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of intra-symbol multiplexing with single carrier waveforms as described herein. For example, the communications manager 1420 may include a resource assignment component 1425, an intra-symbol multiplexing configuration component 1430, an intra-symbol multiplexed communication component 1435, a cyclic prefix component 1440, a guard interval component 1445, a mixed mode component 1450, or any combination thereof. Each of these components may communicate, directly or indirectly, with one another (e.g., via one or more buses).

The communications manager 1420 may support wireless communications at a UE in accordance with examples as disclosed herein. The resource assignment component 1425 may be configured as or otherwise support a means for receiving, from a base station, a time domain resource assignment allocating a fraction of a symbol period for communications with the base station. The intra-symbol multiplexing configuration component 1430 may be configured as or otherwise support a means for identifying an intra-symbol multiplexing configuration for the symbol period based on the time domain resource assignment. The intra-symbol multiplexed communication component 1435 may be configured as or otherwise support a means for communicating, with the base station, a single carrier waveform within the symbol period in accordance with the intra-symbol multiplexing configuration and the time domain resource assignment.

In some examples, to support identifying the intra-symbol multiplexing configuration, the intra-symbol multiplexing configuration component 1430 may be configured as or otherwise support a means for receiving, from the base station, a control message indicating the intra-symbol multiplexing configuration.

In some examples, to support communicating the single carrier waveform within the symbol period, the cyclic prefix component 1440 may be configured as or otherwise support a means for communicating the single carrier waveform within the symbol period including a symbol level cyclic prefix and a cyclic prefix within a resource of the time domain resource assignment.

In some examples, to support communicating the single carrier waveform within the symbol period, the cyclic prefix component 1440 may be configured as or otherwise support a means for communicating the single carrier waveform within the symbol period including a cyclic prefix preceding a resource of the time domain resource assignment.

In some examples, to support communicating the single carrier waveform within the symbol period, the cyclic prefix component 1440 may be configured as or otherwise support a means for communicating the single carrier waveform within the symbol period including a symbol level cyclic prefix for the symbol period.

In some examples, to support communicating the single carrier waveform within the symbol period, the cyclic prefix component 1440 may be configured as or otherwise support a means for communicating the single carrier waveform within the symbol period including a symbol level cyclic prefix and a cyclic prefix within at least one resource assignment of the set of multiple time domain resource assignments.

In some examples, to support communicating the single carrier waveform within the symbol period, the guard interval component 1445 may be configured as or otherwise support a means for communicating the single carrier waveform within the symbol period including a guard interval corresponding to a resource of the time domain resource assignment, where an additional guard interval occurs in a second symbol period preceding the symbol period.

In some examples, to support communicating the single carrier waveform within the symbol period, the guard interval component 1445 may be configured as or otherwise support a means for communicating the single carrier waveform within the symbol period based on a guard interval occurring in a second symbol period preceding the symbol period.

In some examples, to support communicating the single carrier waveform within the symbol period, the guard interval component 1445 may be configured as or otherwise support a means for communicating the single carrier waveform within the symbol period including a guard interval for at least one resource assignment of the set of multiple time domain resource assignments, where an additional guard interval occurs in a second symbol period preceding the symbol period.

In some examples, to support communicating the single carrier waveform within the symbol period, the mixed mode component 1450 may be configured as or otherwise support a means for communicating the single carrier waveform within the symbol period including a symbol level cyclic prefix and a guard interval corresponding to a resource of the time domain resource assignment.

Figure 15:
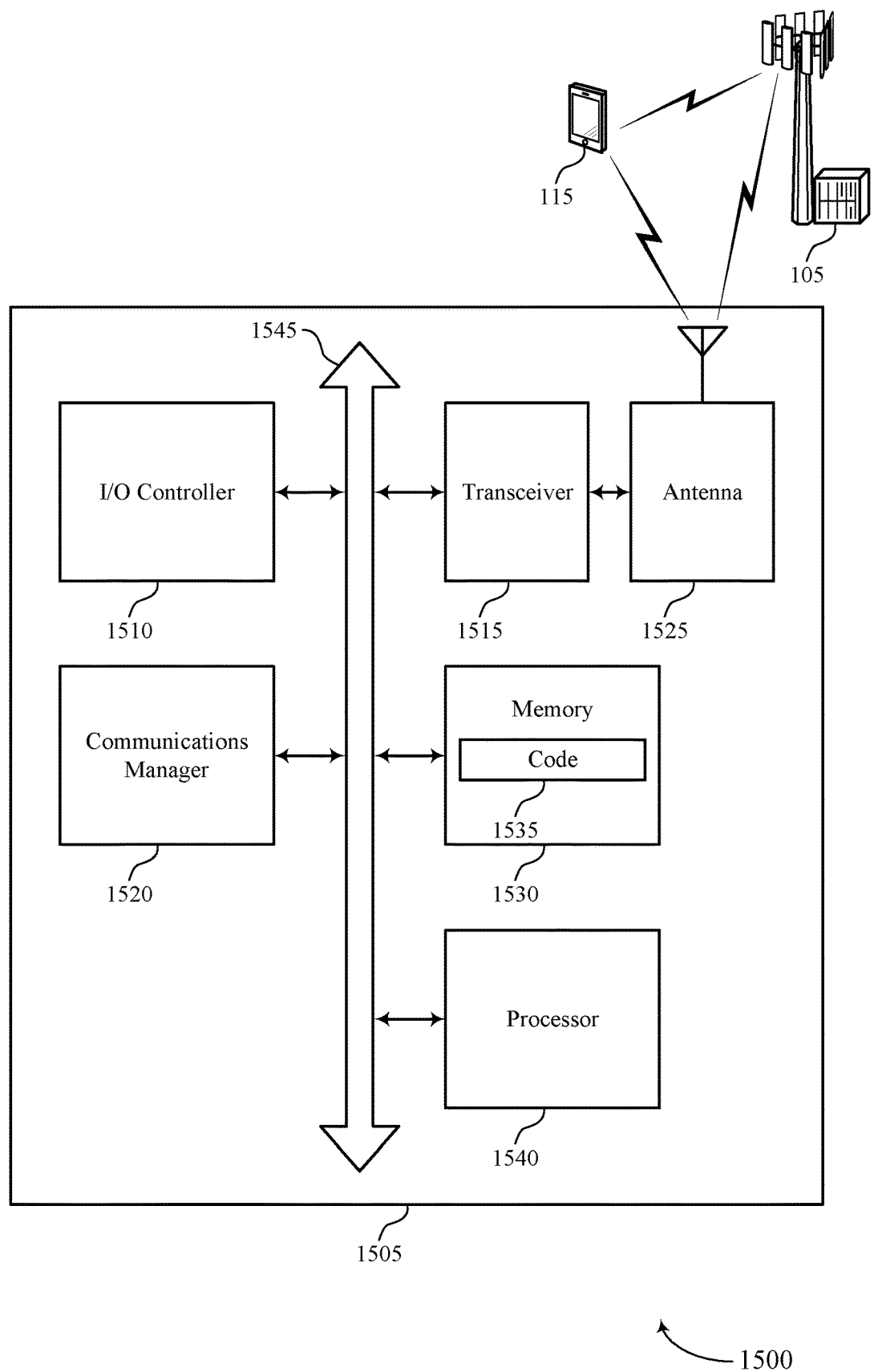
FIG. 15 shows a diagram of a system including a device that supports intra-symbol multiplexing with single carrier waveforms in accordance with aspects of the present disclosure.

FIG. 15 shows a diagram of a system 1500 including a device 1505 that supports intra-symbol multiplexing with single carrier waveforms in accordance with aspects of the present disclosure. The device 1505 may be an example of or include the components of a device 1205, a device 1305, or a UE 115 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting intra-symbol multiplexing with single carrier waveforms). For example, the device 1505 or a component of the device 1505 may include a processor 1540 and memory 1530 coupled to the processor 1540, the processor 1540 and memory 1530 configured to perform various functions described herein.

The communications manager 1520 may support wireless communications at a UE in accordance with examples as disclosed herein. For example, the communications manager 1520 may be configured as or otherwise support a means for receiving, from a base station, a time domain resource assignment allocating a fraction of a symbol period for communications with the base station. The communications manager 1520 may be configured as or otherwise support a means for identifying an intra-symbol multiplexing configuration for the symbol period based on the time domain resource assignment. The communications manager 1520 may be configured as or otherwise support a means for communicating, with the base station, a single carrier waveform within the symbol period in accordance with the intra-symbol multiplexing configuration and the time domain resource assignment.

By including or configuring the communications manager 1520 in accordance with examples as described herein, the device 1505 may support techniques for improved communication reliability, more efficient utilization of communication resources, and improved coordination between devices. For example, the intra-symbol multiplexing configuration may improve reliability of different signals communicated within a symbol period by reducing chances that signals leak from one fractional resource allocation (e.g., fractional resource assignments, segments, etc.) to a subsequent fractional resource allocation. Additionally, the multiplexing may enable multiple signals to be combined in a single message on a single set of time and frequency resources, thereby using the communication resources more efficiently. In some examples, based on identifying the intra-symbol multiplexing configuration, the device 1505 may have improved coordination with an additional device (e.g., a base station 105) such that both devices identify the same intra-symbol multiplexing configuration to support subsequent communications.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of intra-symbol multiplexing with single carrier waveforms as described herein, or the processor 1540 and the memory 1530 may be otherwise configured to perform or support such operations.

Figure 16:
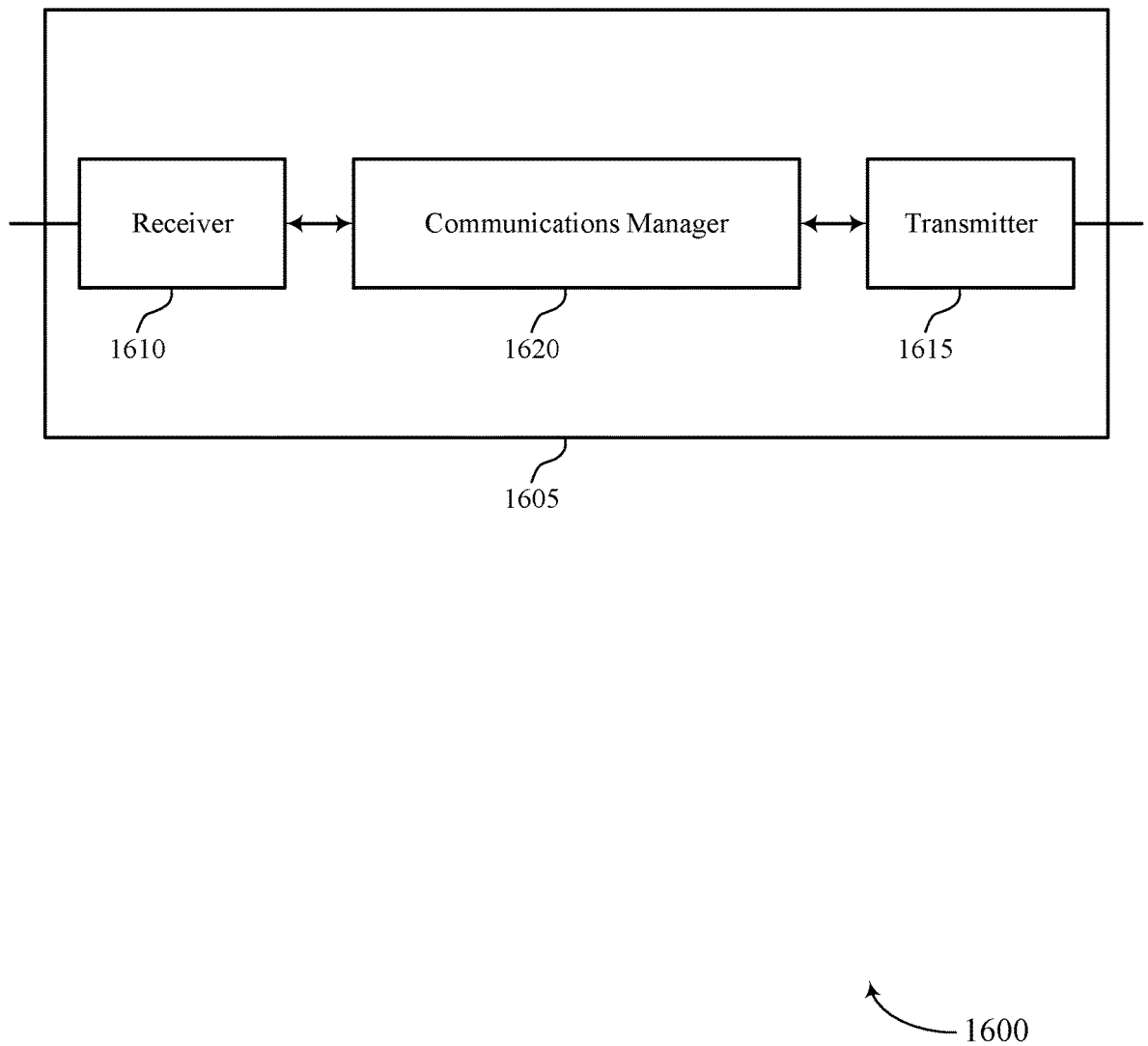
FIGS. 16 and 17 show block diagrams of devices that support intra-symbol multiplexing with single carrier waveforms in accordance with aspects of the present disclosure.

FIG. 16 shows a block diagram 1600 of a device 1605 that supports intra-symbol multiplexing with single carrier waveforms in accordance with aspects of the present disclosure. The device 1605 may be an example of aspects of a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to intra-symbol multiplexing with single carrier waveforms). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to intra-symbol multiplexing with single carrier waveforms). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of intra-symbol multiplexing with single carrier waveforms as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1620 may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a base station in accordance with examples as disclosed herein. For example, the communications manager 1620 may be configured as or otherwise support a means for transmitting, to one or more user equipments (UEs), a set of multiple time domain resource assignments that allocate respective fractions of a symbol period. The communications manager 1620 may be configured as or otherwise support a means for identifying an intra-symbol multiplexing configuration for the symbol period based on the set of multiple time domain resource assignments. The communications manager 1620 may be configured as or otherwise support a means for communicating, with the one or more UEs, a single carrier waveform within the symbol period in accordance with the intra-symbol multiplexing configuration and the set of multiple time domain resource assignments.

Figure 17:
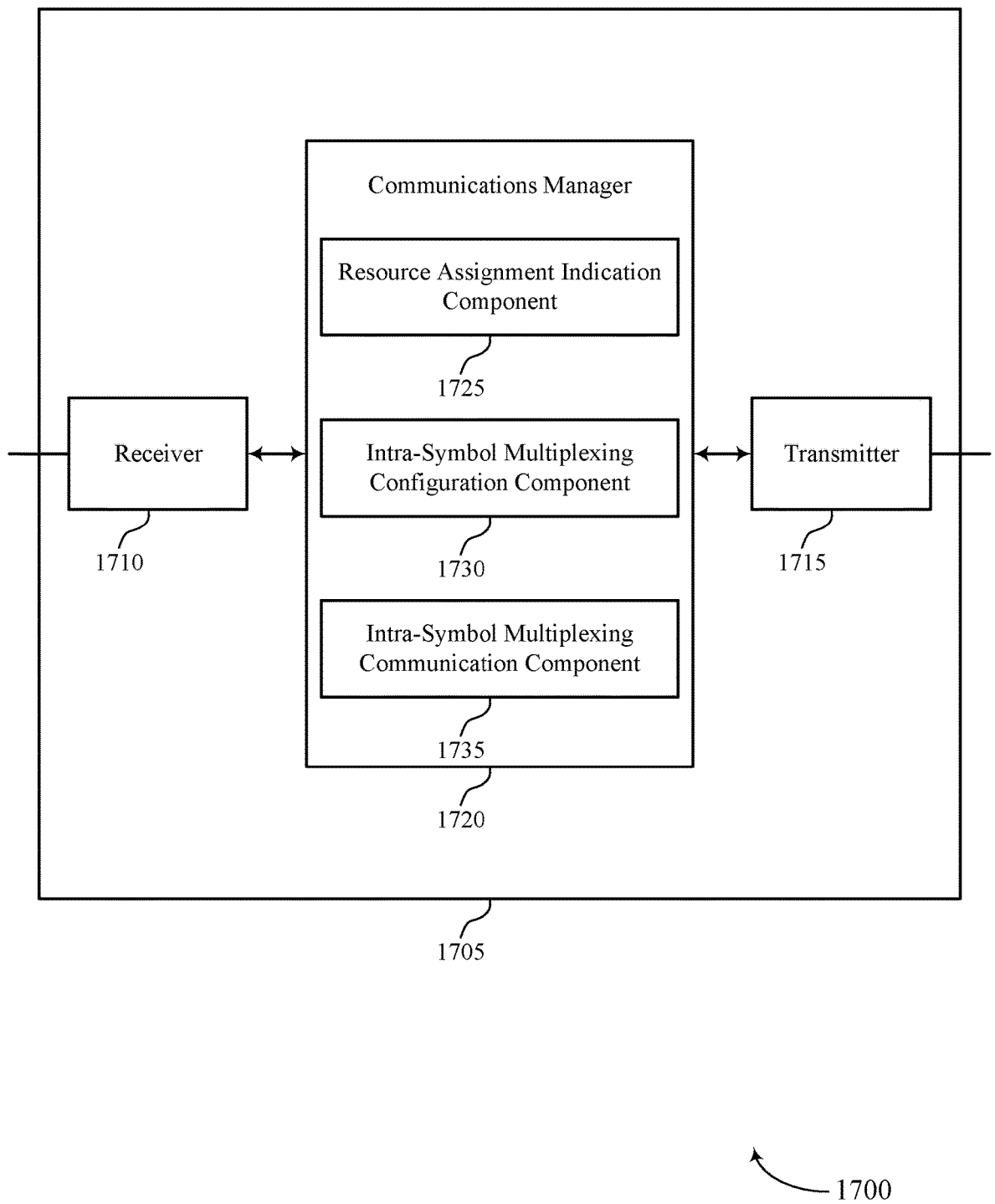

FIG. 17 shows a block diagram 1700 of a device 1705 that supports intra-symbol multiplexing with single carrier waveforms in accordance with aspects of the present disclosure. The device 1705 may be an example of aspects of a device 1605 or a base station 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to intra-symbol multiplexing with single carrier waveforms). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to intra-symbol multiplexing with single carrier waveforms). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of intra-symbol multiplexing with single carrier waveforms as described herein. For example, the communications manager 1720 may include a resource assignment indication component 1725, an intra-symbol multiplexing configuration component 1730, an intra-symbol multiplexing communication component 1735, or any combination thereof. The communications manager 1720 may be an example of aspects of a communications manager 1620 as described herein. In some examples, the communications manager 1720, or various components thereof, may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communications at a base station in accordance with examples as disclosed herein. The resource assignment indication component 1725 may be configured as or otherwise support a means for transmitting, to one or more user equipments (UEs), a set of multiple time domain resource assignments that allocate respective fractions of a symbol period. The intra-symbol multiplexing configuration component 1730 may be configured as or otherwise support a means for identifying an intra-symbol multiplexing configuration for the symbol period based on the set of multiple time domain resource assignments. The intra-symbol multiplexing communication component 1735 may be configured as or otherwise support a means for communicating, with the one or more UEs, a single carrier waveform within the symbol period in accordance with the intra-symbol multiplexing configuration and the set of multiple time domain resource assignments.

Figure 18:
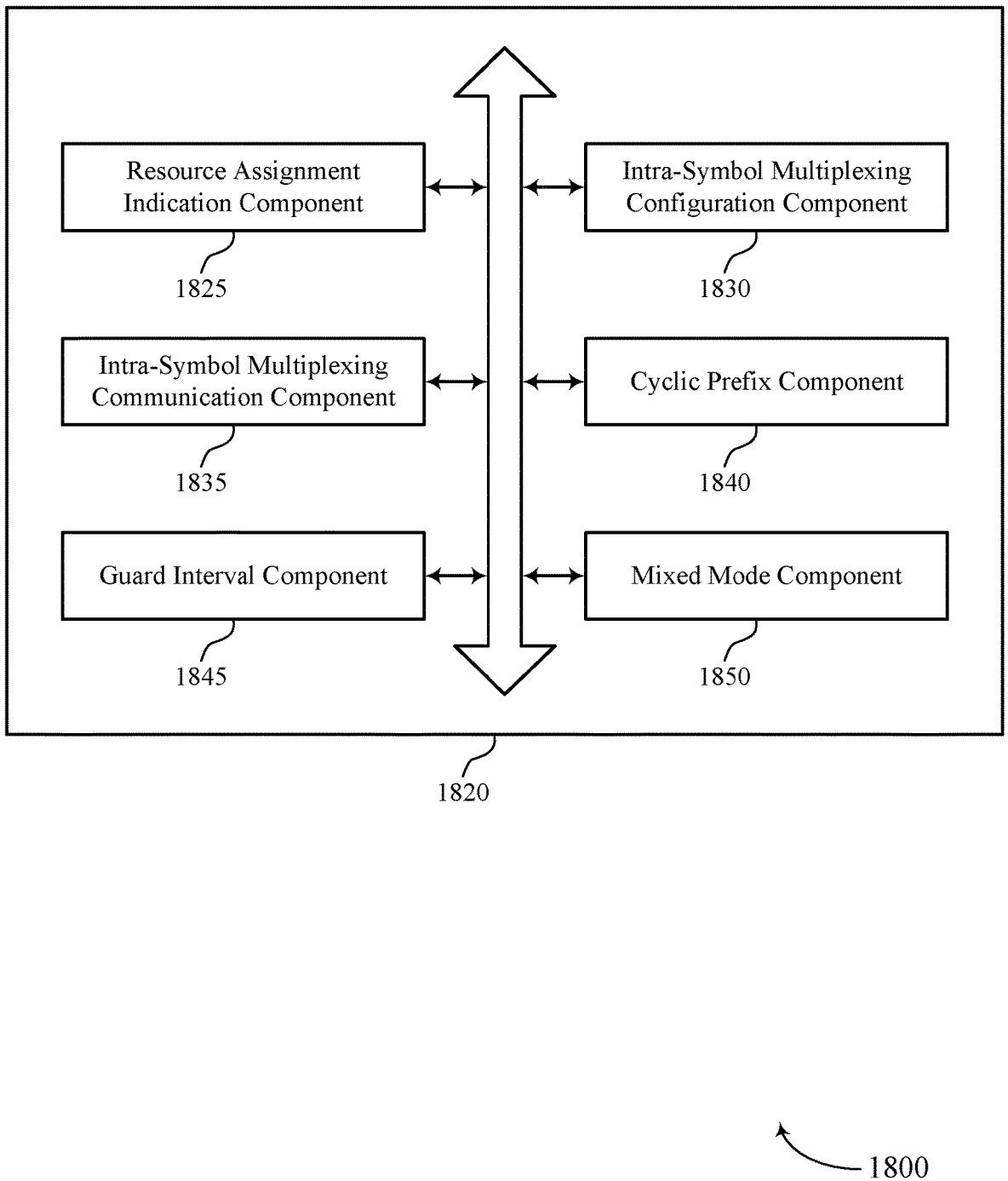
FIG. 18 shows a block diagram of a communications manager that supports intra-symbol multiplexing with single carrier waveforms in accordance with aspects of the present disclosure.

FIG. 18 shows a block diagram 1800 of a communications manager 1820 that supports intra-symbol multiplexing with single carrier waveforms in accordance with aspects of the present disclosure. The communications manager 1820 may be an example of aspects of a communications manager 1620, a communications manager 1720, or both, as described herein. The communications manager 1820, or various components thereof, may be an example of means for performing various aspects of intra-symbol multiplexing with single carrier waveforms as described herein. For example, the communications manager 1820 may include a resource assignment indication component 1825, an intra-symbol multiplexing configuration component 1830, an intra-symbol multiplexing communication component 1835, a cyclic prefix component 1840, a guard interval component 1845, a mixed mode component 1850, or any combination thereof. Each of these components may communicate, directly or indirectly, with one another (e.g., via one or more buses).

The communications manager 1820 may support wireless communications at a base station in accordance with examples as disclosed herein. The resource assignment indication component 1825 may be configured as or otherwise support a means for transmitting, to one or more user equipments (UEs), a set of multiple time domain resource assignments that allocate respective fractions of a symbol period. The intra-symbol multiplexing configuration component 1830 may be configured as or otherwise support a means for identifying an intra-symbol multiplexing configuration for the symbol period based on the set of multiple time domain resource assignments. The intra-symbol multiplexing communication component 1835 may be configured as or otherwise support a means for communicating, with the one or more UEs, a single carrier waveform within the symbol period in accordance with the intra-symbol multiplexing configuration and the set of multiple time domain resource assignments.

In some examples, to support identifying the intra-symbol multiplexing configuration, the intra-symbol multiplexing configuration component 1830 may be configured as or otherwise support a means for transmitting, to the one or more UEs, a control message indicating the intra-symbol multiplexing configuration.

In some examples, to support communicating the single carrier waveform within the symbol period, the cyclic prefix component 1840 may be configured as or otherwise support a means for communicating the single carrier waveform within the symbol period including a symbol level cyclic prefix and a respective cyclic prefix within each resource assignment of the set of multiple time domain resource assignments.

In some examples, to support communicating the single carrier waveform within the symbol period, the cyclic prefix component 1840 may be configured as or otherwise support a means for communicating the single carrier waveform within the symbol period including a respective cyclic prefix for each resource assignment of the set of multiple time domain resource assignments.

In some examples, to support communicating the single carrier waveform within the symbol period, the cyclic prefix component 1840 may be configured as or otherwise support a means for communicating the single carrier waveform within the symbol period including a symbol level cyclic prefix prior to a beginning resource assignment of the set of multiple time domain resource assignments.

In some examples, to support communicating the single carrier waveform within the symbol period, the cyclic prefix component 1840 may be configured as or otherwise support a means for communicating the single carrier waveform within the symbol period including a symbol level cyclic prefix and a cyclic prefix within at least one resource assignment of the set of multiple time domain resource assignments.

In some examples, to support communicating the single carrier waveform within the symbol period, the guard interval component 1845 may be configured as or otherwise support a means for communicating the single carrier waveform within the symbol period including a respective guard interval within each resource assignment of the set of multiple time domain resource assignments, where an additional guard interval occurs in a second symbol period preceding the symbol period.

In some examples, to support communicating the single carrier waveform within the symbol period, the guard interval component 1845 may be configured as or otherwise support a means for communicating the single carrier waveform within the symbol period based on a guard interval occurring in a second symbol period preceding the symbol period.

In some examples, to support communicating the single carrier waveform within the symbol period, the guard interval component 1845 may be configured as or otherwise support a means for communicating the single carrier waveform within the symbol period including a guard interval for at least one resource assignment of the set of multiple time domain resource assignments, where an additional guard interval occurs in a second symbol period preceding the symbol period.

In some examples, to support communicating the single carrier waveform within the symbol period, the mixed mode component 1850 may be configured as or otherwise support a means for communicating the single carrier waveform within the symbol period including a symbol level cyclic prefix preceding a beginning resource assignment of the set of multiple time domain resource assignments and a guard interval within at least one of the set of multiple time domain resource assignments.

Figure 19:
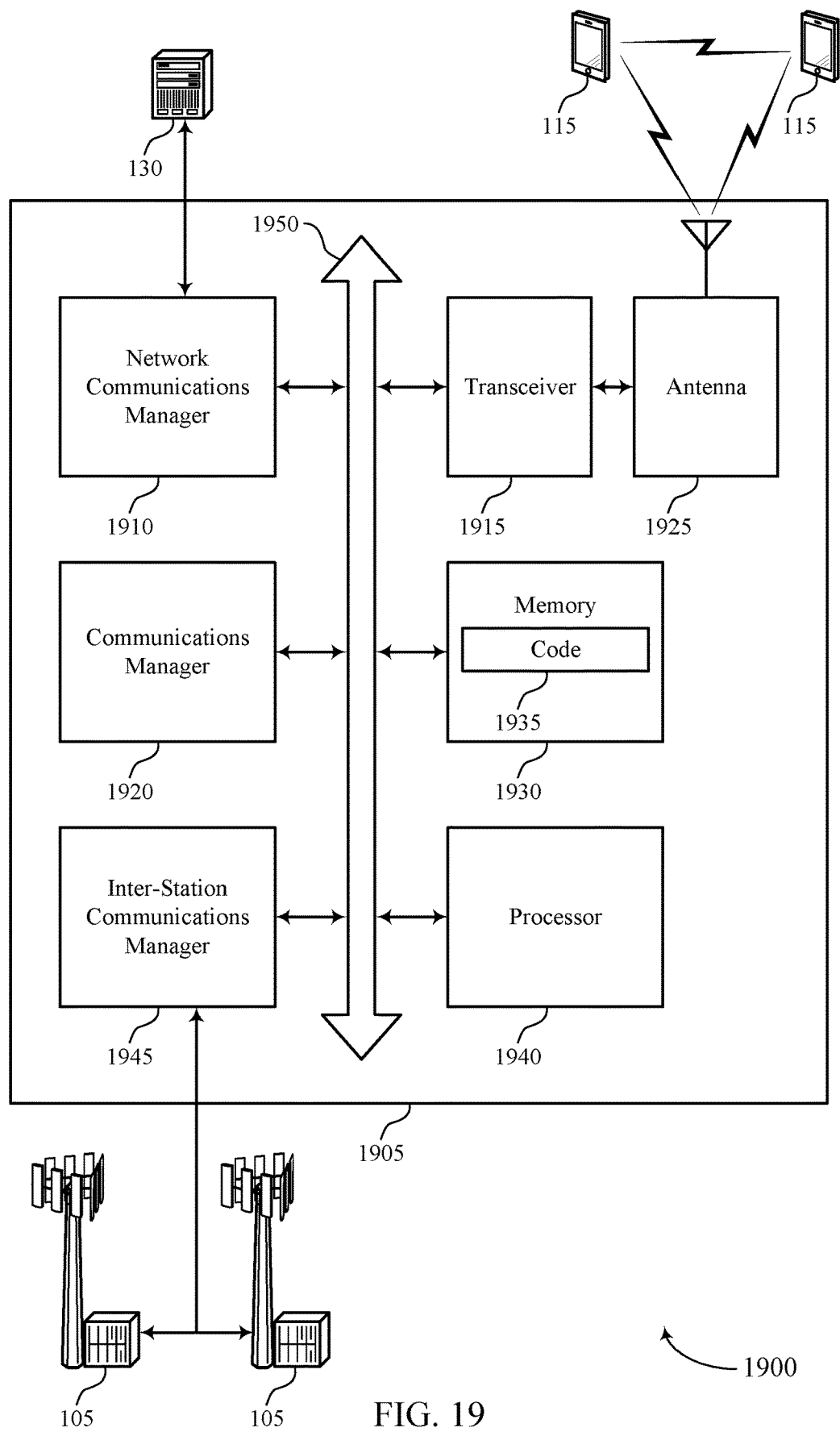
FIG. 19 shows a diagram of a system including a device that supports intra-symbol multiplexing with single carrier waveforms in accordance with aspects of the present disclosure.

FIG. 19 shows a diagram of a system 1900 including a device 1905 that supports intra-symbol multiplexing with single carrier waveforms in accordance with aspects of the present disclosure. The device 1905 may be an example of or include the components of a device 1605, a device 1705, or a base station 105 as described herein. The device 1905 may communicate wirelessly with one or more base stations 105, UEs 115, or any combination thereof. The device 1905 may include components for bi-directional voice and data communications including components for transmitting and receiving communications, such as a communications manager 1920, a network communications manager 1910, a transceiver 1915, an antenna 1925, a memory 1930, code 1935, a processor 1940, and an inter-station communications manager 1945. These components may be in electronic communication or otherwise coupled (e.g., operatively, communicatively, functionally, electronically, electrically) via one or more buses (e.g., a bus 1950).

The network communications manager 1910 may manage communications with a core network 130 (e.g., via one or more wired backhaul links). For example, the network communications manager 1910 may manage the transfer of data communications for client devices, such as one or more UEs 115.

In some cases, the device 1905 may include a single antenna 1925. However, in some other cases the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include RAM and ROM. The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a BIOS which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting intra-symbol multiplexing with single carrier waveforms). For example, the device 1905 or a component of the device 1905 may include a processor 1940 and memory 1930 coupled to the processor 1940, the processor 1940 and memory 1930 configured to perform various functions described herein.

The inter-station communications manager 1945 may manage communications with other base stations 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communications network technology to provide communication between base stations 105.

The communications manager 1920 may support wireless communications at a base station in accordance with examples as disclosed herein. For example, the communications manager 1920 may be configured as or otherwise support a means for transmitting, to one or more user equipments (UEs), a set of multiple time domain resource assignments that allocate respective fractions of a symbol period. The communications manager 1920 may be configured as or otherwise support a means for identifying an intra-symbol multiplexing configuration for the symbol period based on the set of multiple time domain resource assignments. The communications manager 1920 may be configured as or otherwise support a means for communicating, with the one or more UEs, a single carrier waveform within the symbol period in accordance with the intra-symbol multiplexing configuration and the set of multiple time domain resource assignments.

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of intra-symbol multiplexing with single carrier waveforms as described herein, or the processor 1940 and the memory 1930 may be otherwise configured to perform or support such operations.

Figure 20:
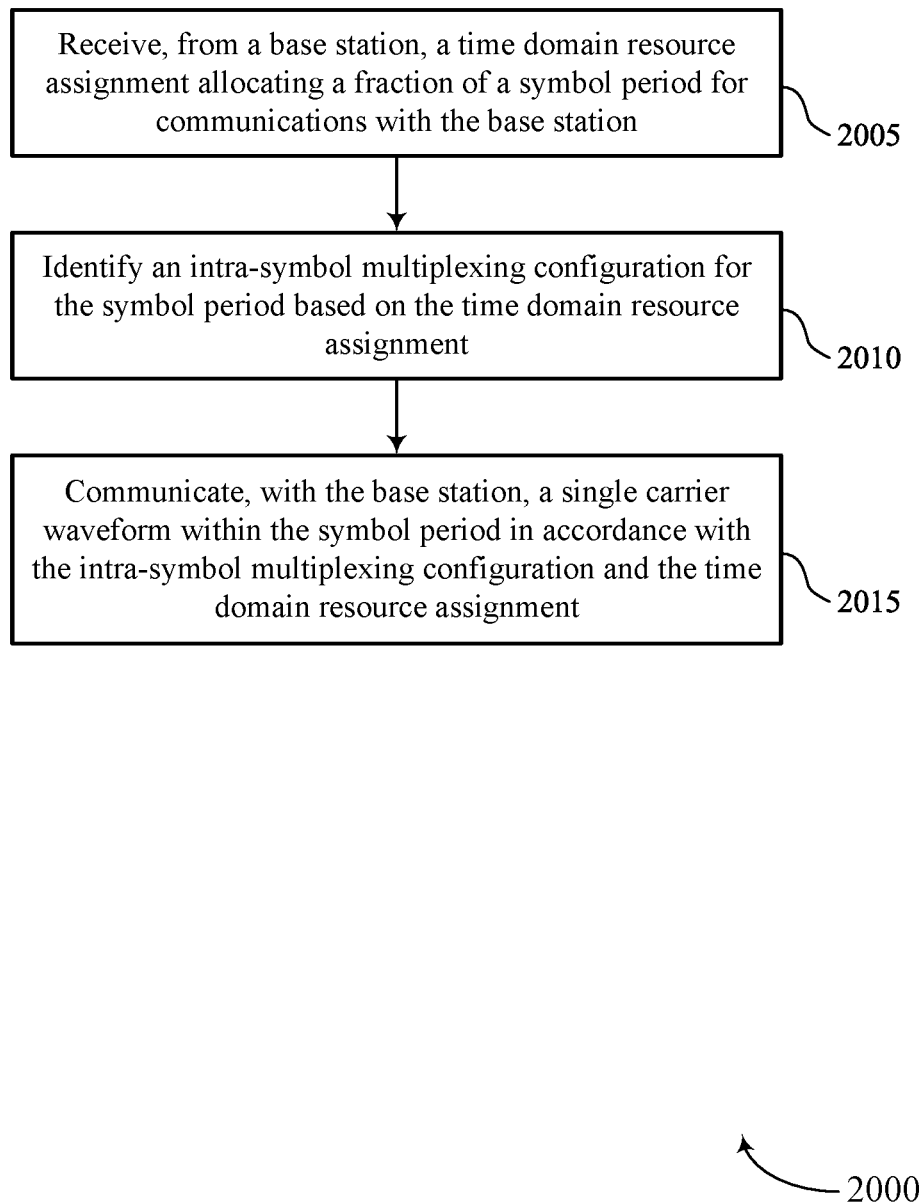
FIGS. 20 through 25 show flowcharts illustrating methods that support intra-symbol multiplexing with single carrier waveforms in accordance with aspects of the present disclosure.

FIG. 20 shows a flowchart illustrating a method 2000 that supports intra-symbol multiplexing with single carrier waveforms in accordance with aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, a time domain resource assignment allocating a fraction of a symbol period for communications with the base station. The operations of 2005 may be performed in accordance with examples as disclosed herein. In some examples, aspects of the operations of 2005 may be performed by a resource assignment component 1425 as described with reference to FIG. 14.

At 2010, the method may include identifying an intra-symbol multiplexing configuration for the symbol period based on the time domain resource assignment. The operations of 2010 may be performed in accordance with examples as disclosed herein. In some examples, aspects of the operations of 2010 may be performed by an intra-symbol multiplexing configuration component 1430 as described with reference to FIG. 14.

At 2015, the method may include communicating, with the base station, a single carrier waveform within the symbol period in accordance with the intra-symbol multiplexing configuration and the time domain resource assignment. The operations of 2015 may be performed in accordance with examples as disclosed herein. In some examples, aspects of the operations of 2015 may be performed by an intra-symbol multiplexed communication component 1435 as described with reference to FIG. 14.

Figure 21:
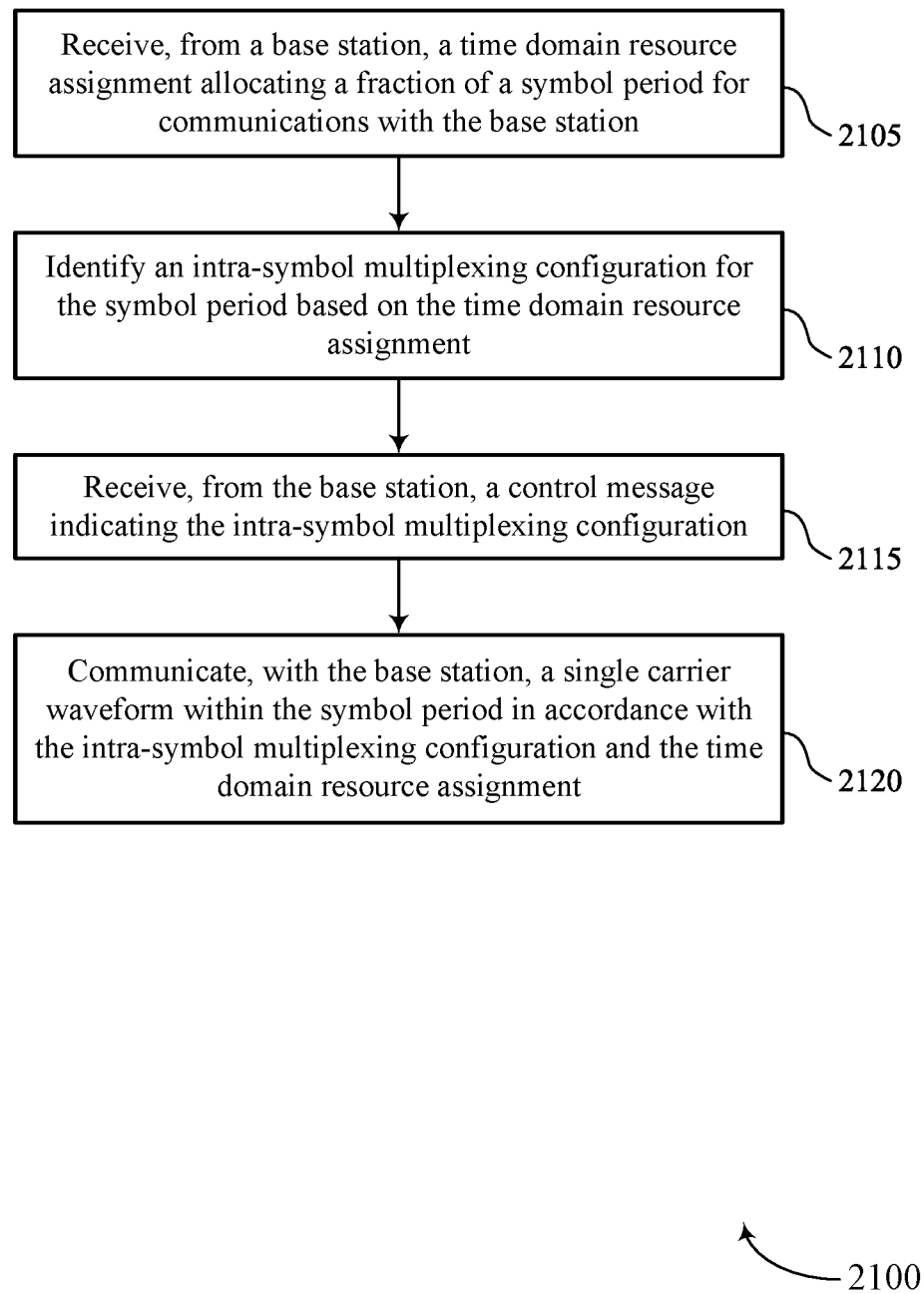

FIG. 21 shows a flowchart illustrating a method 2100 that supports intra-symbol multiplexing with single carrier waveforms in accordance with aspects of the present disclosure. The operations of the method 2100 may be implemented by a UE or its components as described herein. For example, the operations of the method 2100 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a time domain resource assignment allocating a fraction of a symbol period for communications with the base station. The operations of 2105 may be performed in accordance with examples as disclosed herein. In some examples, aspects of the operations of 2105 may be performed by a resource assignment component 1425 as described with reference to FIG. 14.

At 2110, the method may include identifying an intra-symbol multiplexing configuration for the symbol period based on the time domain resource assignment. The operations of 2110 may be performed in accordance with examples as disclosed herein. In some examples, aspects of the operations of 2110 may be performed by an intra-symbol multiplexing configuration component 1430 as described with reference to FIG. 14.

At 2115, the method may include receiving, from the base station, a control message indicating the intra-symbol multiplexing configuration. The operations of 2115 may be performed in accordance with examples as disclosed herein. In some examples, aspects of the operations of 2115 may be performed by an intra-symbol multiplexing configuration component 1430 as described with reference to FIG. 14.

At 2120, the method may include communicating, with the base station, a single carrier waveform within the symbol period in accordance with the intra-symbol multiplexing configuration and the time domain resource assignment. The operations of 2120 may be performed in accordance with examples as disclosed herein. In some examples, aspects of the operations of 2120 may be performed by an intra-symbol multiplexed communication component 1435 as described with reference to FIG. 14.

Figure 22:
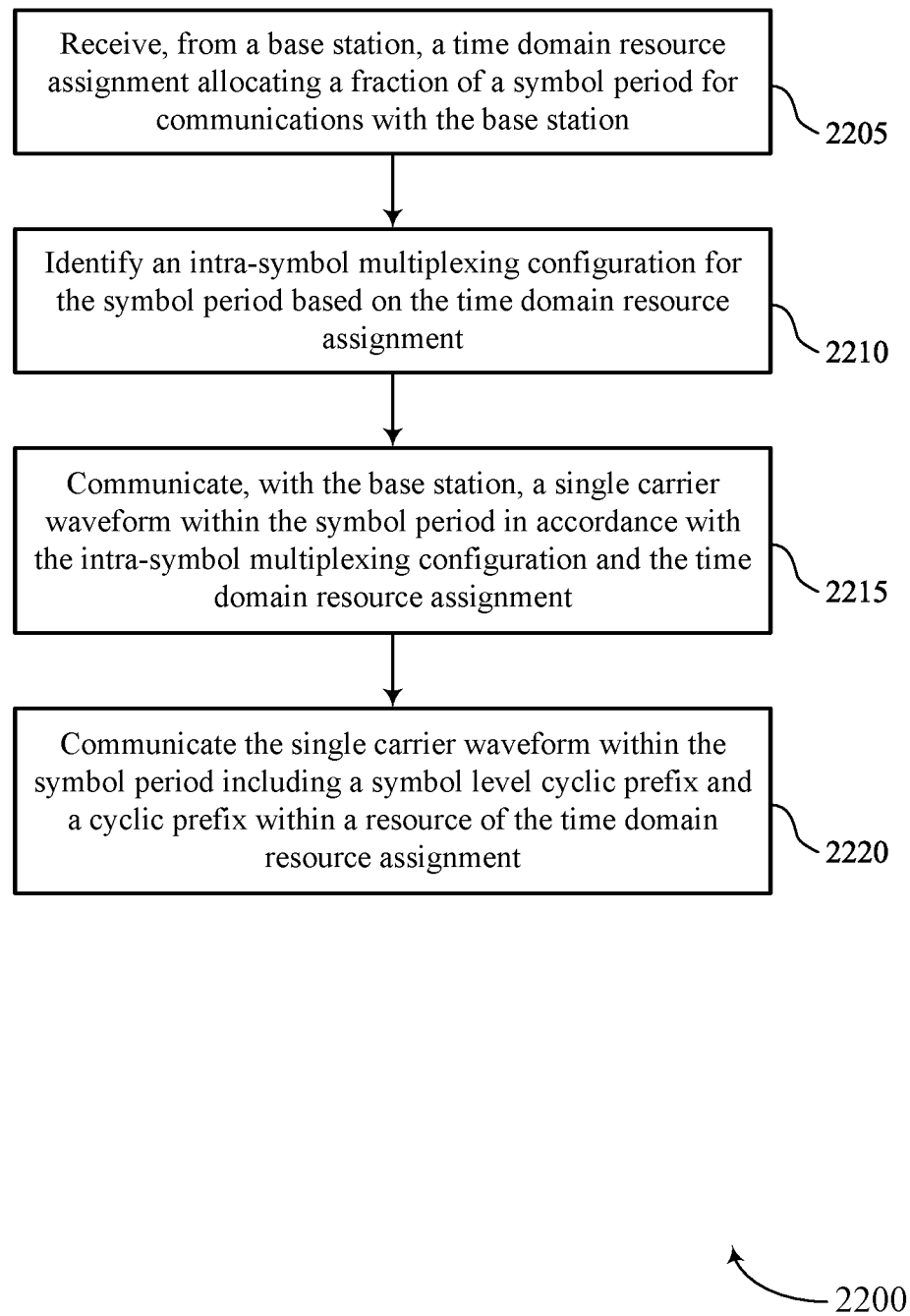

FIG. 22 shows a flowchart illustrating a method 2200 that supports intra-symbol multiplexing with single carrier waveforms in accordance with aspects of the present disclosure. The operations of the method 2200 may be implemented by a UE or its components as described herein. For example, the operations of the method 2200 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, a time domain resource assignment allocating a fraction of a symbol period for communications with the base station. The operations of 2205 may be performed in accordance with examples as disclosed herein. In some examples, aspects of the operations of 2205 may be performed by a resource assignment component 1425 as described with reference to FIG. 14.

At 2210, the method may include identifying an intra-symbol multiplexing configuration for the symbol period based on the time domain resource assignment. The operations of 2210 may be performed in accordance with examples as disclosed herein. In some examples, aspects of the operations of 2210 may be performed by an intra-symbol multiplexing configuration component 1430 as described with reference to FIG. 14.

At 2215, the method may include communicating, with the base station, a single carrier waveform within the symbol period in accordance with the intra-symbol multiplexing configuration and the time domain resource assignment. The operations of 2215 may be performed in accordance with examples as disclosed herein. In some examples, aspects of the operations of 2215 may be performed by an intra-symbol multiplexed communication component 1435 as described with reference to FIG. 14.

At 2220, the method may include communicating the single carrier waveform within the symbol period including a symbol level cyclic prefix and a cyclic prefix within a resource of the time domain resource assignment. The operations of 2220 may be performed in accordance with examples as disclosed herein. In some examples, aspects of the operations of 2220 may be performed by a cyclic prefix component 1440 as described with reference to FIG. 14.

Figure 23:
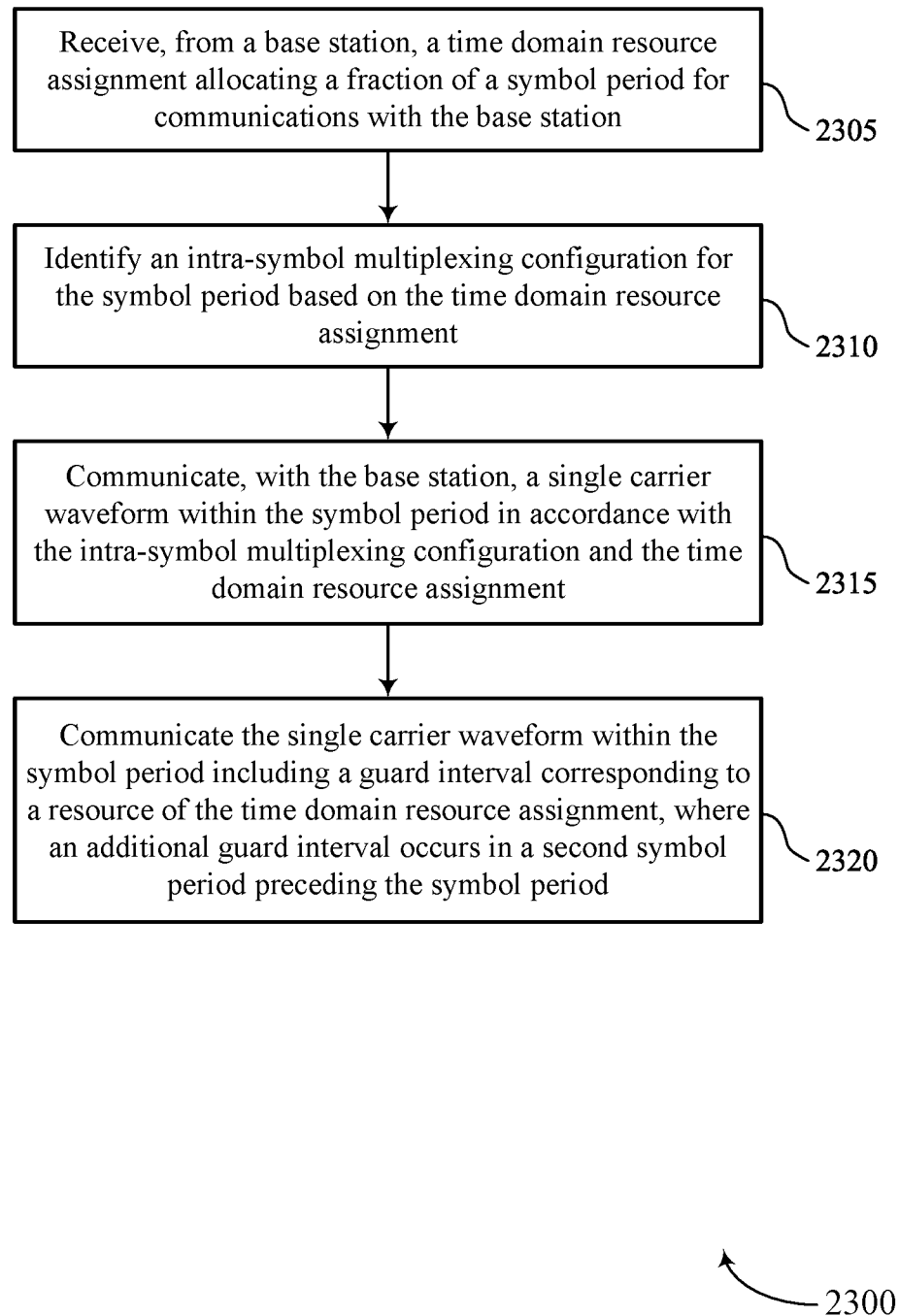

FIG. 23 shows a flowchart illustrating a method 2300 that supports intra-symbol multiplexing with single carrier waveforms in accordance with aspects of the present disclosure. The operations of the method 2300 may be implemented by a UE or its components as described herein. For example, the operations of the method 2300 may be performed by a UE 115 as described with reference to FIGS. 1 through 15. In some examples, a UE may execute a set of instructions to control the functional elements of the UE to perform the described functions. Additionally or alternatively, the UE may perform aspects of the described functions using special-purpose hardware.

At 2305, the method may include receiving, from a base station, a time domain resource assignment allocating a fraction of a symbol period for communications with the base station. The operations of 2305 may be performed in accordance with examples as disclosed herein. In some examples, aspects of the operations of 2305 may be performed by a resource assignment component 1425 as described with reference to FIG. 14.

At 2310, the method may include identifying an intra-symbol multiplexing configuration for the symbol period based on the time domain resource assignment. The operations of 2310 may be performed in accordance with examples as disclosed herein. In some examples, aspects of the operations of 2310 may be performed by an intra-symbol multiplexing configuration component 1430 as described with reference to FIG. 14.

At 2315, the method may include communicating, with the base station, a single carrier waveform within the symbol period in accordance with the intra-symbol multiplexing configuration and the time domain resource assignment. The operations of 2315 may be performed in accordance with examples as disclosed herein. In some examples, aspects of the operations of 2315 may be performed by an intra-symbol multiplexed communication component 1435 as described with reference to FIG. 14.

At 2320, the method may include communicating the single carrier waveform within the symbol period including a guard interval corresponding to a resource of the time domain resource assignment, where an additional guard interval occurs in a second symbol period preceding the symbol period. The operations of 2320 may be performed in accordance with examples as disclosed herein. In some examples, aspects of the operations of 2320 may be performed by a guard interval component 1445 as described with reference to FIG. 14.

Figure 24:
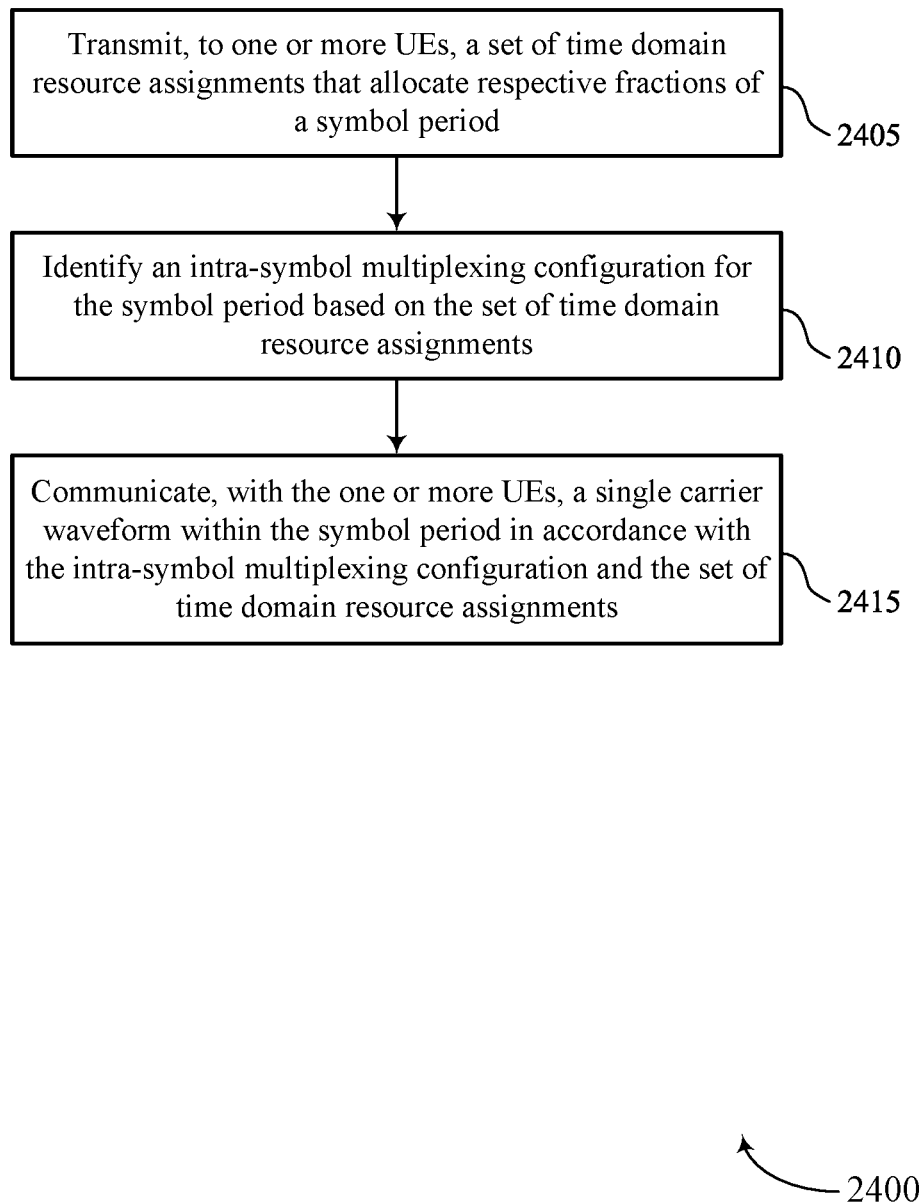

FIG. 24 shows a flowchart illustrating a method 2400 that supports intra-symbol multiplexing with single carrier waveforms in accordance with aspects of the present disclosure. The operations of the method 2400 may be implemented by a base station or its components as described herein. For example, the operations of the method 2400 may be performed by a base station 105 as described with reference to FIGS. 1 through 11 and 16 through 19. In some examples, a base station may execute a set of instructions to control the functional elements of the base station to perform the described functions. Additionally or alternatively, the base station may perform aspects of the described functions using special-purpose hardware.

At 2405, the method may include transmitting, to one or more user equipments (UEs), a set of multiple time domain resource assignments that allocate respective fractions of a symbol period. The operations of 2405 may be performed in accordance with examples as disclosed herein. In some examples, aspects of the operations of 2405 may be performed by a resource assignment indication component 1825 as described with reference to FIG. 18.

At 2410, the method may include identifying an intra-symbol multiplexing configuration for the symbol period based on the set of multiple time domain resource assignments. The operations of 2410 may be performed in accordance with examples as disclosed herein. In some examples, aspects of the operations of 2410 may be performed by an intra-symbol multiplexing configuration component 1830 as described with reference to FIG. 18.

At 2415, the method may include communicating, with the one or more UEs, a single carrier waveform within the symbol period in accordance with the intra-symbol multiplexing configuration and the set of multiple time domain resource assignments. The operations of 2415 may be performed in accordance with examples as disclosed herein. In some examples, aspects of the operations of 2415 may be performed by an intra-symbol multiplexing communication component 1835 as described with reference to FIG. 18.

Figure 25:
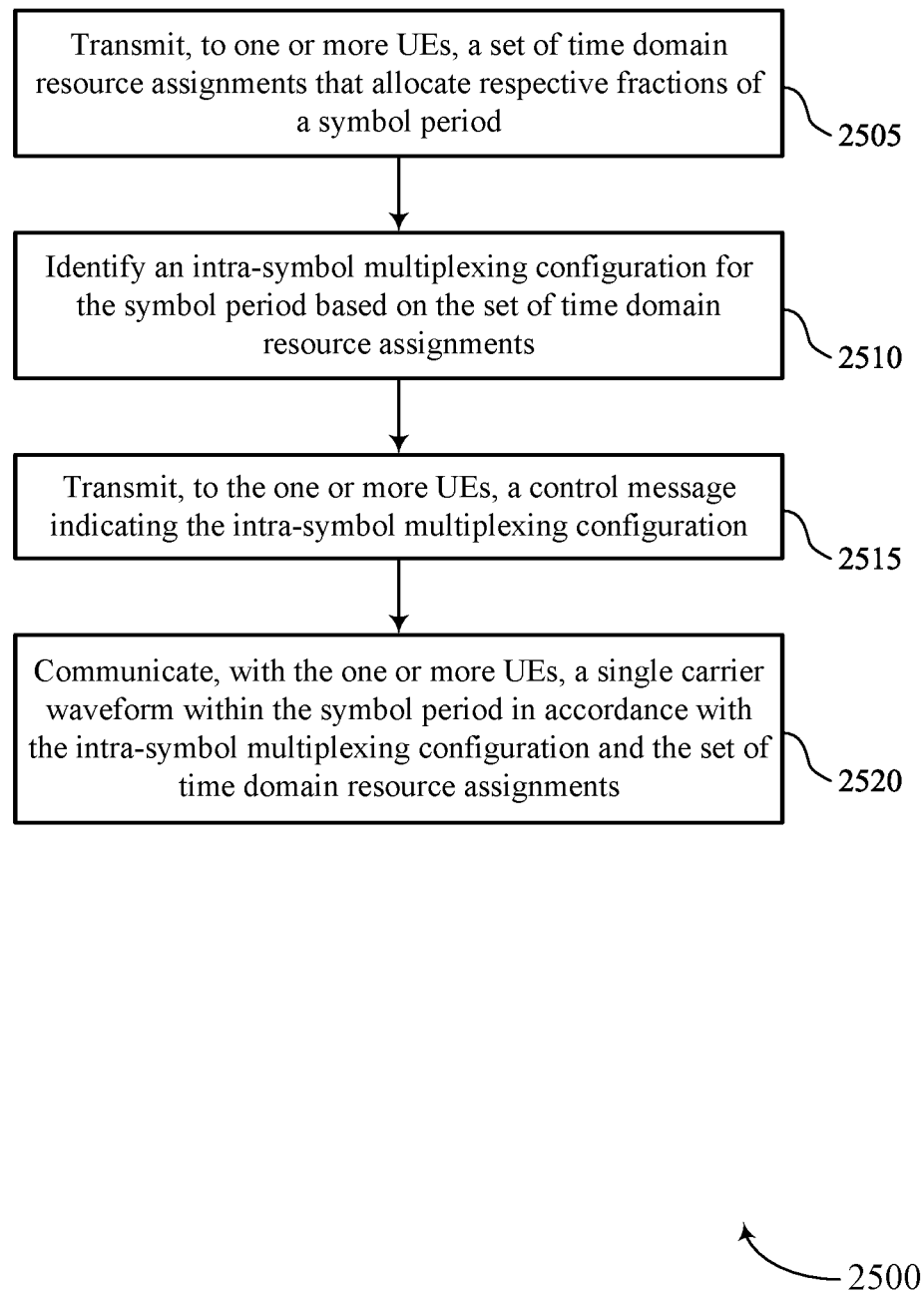

FIG. 25 shows a flowchart illustrating a method 2500 that supports intra-symbol multiplexing with single carrier waveforms in accordance with aspects of the present disclosure. The operations of the method 2500 may be implemented by a base station or its components as described herein. For example, the operations of the method 2500 may be performed by a base station 105 as described with reference to FIGS. 1 through 11 and 16 through 19. In some examples, a base station may execute a set of instructions to control the functional elements of the base station to perform the described functions. Additionally or alternatively, the base station may perform aspects of the described functions using special-purpose hardware.

At 2505, the method may include transmitting, to one or more user equipments (UEs), a set of multiple time domain resource assignments that allocate respective fractions of a symbol period. The operations of 2505 may be performed in accordance with examples as disclosed herein. In some examples, aspects of the operations of 2505 may be performed by a resource assignment indication component 1825 as described with reference to FIG. 18.

At 2510, the method may include identifying an intra-symbol multiplexing configuration for the symbol period based on the set of multiple time domain resource assignments. The operations of 2510 may be performed in accordance with examples as disclosed herein. In some examples, aspects of the operations of 2510 may be performed by an intra-symbol multiplexing configuration component 1830 as described with reference to FIG. 18.

At 2515, the method may include transmitting, to the one or more UEs, a control message indicating the intra-symbol multiplexing configuration. The operations of 2515 may be performed in accordance with examples as disclosed herein. In some examples, aspects of the operations of 2515 may be performed by an intra-symbol multiplexing configuration component 1830 as described with reference to FIG. 18.

At 2520, the method may include communicating, with the one or more UEs, a single carrier waveform within the symbol period in accordance with the intra-symbol multiplexing configuration and the set of multiple time domain resource assignments. The operations of 2520 may be performed in accordance with examples as disclosed herein. In some examples, aspects of the operations of 2520 may be performed by an intra-symbol multiplexing communication component 1835 as described with reference to FIG. 18.

The following provides an overview of aspects of the present disclosure:

Aspect 1: A method for wireless communications at a UE, comprising: receiving, from a base station, a time domain resource assignment allocating a fraction of a symbol period for communications with the base station; identifying an intra-symbol multiplexing configuration for the symbol period based at least in part on the time domain resource assignment; and communicating, with the base station, a single carrier waveform within the symbol period in accordance with the intra-symbol multiplexing configuration and the time domain resource assignment.

Aspect 2: The method of aspect 1, wherein identifying the intra-symbol multiplexing configuration comprises: receiving, from the base station, a control message indicating the intra-symbol multiplexing configuration.

Aspect 3: The method of any of aspects 1 through 2, wherein communicating the single carrier waveform within the symbol period further comprises: communicating the single carrier waveform within the symbol period comprising a symbol level cyclic prefix and a cyclic prefix within a resource of the time domain resource assignment.

Aspect 4: The method of any of aspects 1 through 3, wherein communicating the single carrier waveform within the symbol period further comprises: communicating the single carrier waveform within the symbol period comprising a cyclic prefix preceding a resource of the time domain resource assignment.

Aspect 5: The method of any of aspects 1 through 4, wherein communicating the single carrier waveform within the symbol period further comprises: communicating the single carrier waveform within the symbol period comprising a symbol level cyclic prefix for the symbol period.

Aspect 6: The method of any of aspects 1 through 5, wherein the resource assignment is one of a plurality of time domain resource assignments allocating a plurality of channels within the symbol period, and wherein communicating the single carrier waveform within the symbol period further comprises: communicating the single carrier waveform within the symbol period comprising a symbol level cyclic prefix and a cyclic prefix within at least one resource assignment of the plurality of time domain resource assignments.

Aspect 7: The method of any of aspects 1 through 6, wherein communicating the single carrier waveform within the symbol period further comprises: communicating the single carrier waveform within the symbol period comprising a guard interval corresponding to a resource of the time domain resource assignment, wherein an additional guard interval occurs in a second symbol period preceding the symbol period.

Aspect 8: The method of any of aspects 1 through 7, wherein communicating the single carrier waveform within the symbol period further comprises: communicating the single carrier waveform within the symbol period based at least in part on a guard interval occurring in a second symbol period preceding the symbol period.

Aspect 9: The method of any of aspects 1 through 8, wherein the resource assignment is one of a plurality of time domain resource assignments allocating a plurality of channels within the symbol period, and wherein communicating the single carrier waveform within the symbol period further comprises: communicating the single carrier waveform within the symbol period comprising a guard interval for at least one resource assignment of the plurality of time domain resource assignments, wherein an additional guard interval occurs in a second symbol period preceding the symbol period.

Aspect 10: The method of any of aspects 1 through 9, wherein communicating the single carrier waveform within the symbol period further comprises: communicating the single carrier waveform within the symbol period comprising a symbol level cyclic prefix and a guard interval corresponding to a resource of the time domain resource assignment.

Aspect 11: A method for wireless communications at a base station, comprising: transmitting, to one or more user equipments (UEs), a plurality of time domain resource assignments that allocate respective fractions of a symbol period; identifying an intra-symbol multiplexing configuration for the symbol period based at least in part on the plurality of time domain resource assignments; and communicating, with the one or more UEs, a single carrier waveform within the symbol period in accordance with the intra-symbol multiplexing configuration and the plurality of time domain resource assignments.

Aspect 12: The method of aspect 11, wherein identifying the intra-symbol multiplexing configuration comprises: transmitting, to the one or more UEs, a control message indicating the intra-symbol multiplexing configuration.

Aspect 13: The method of any of aspects 11 through 12, wherein communicating the single carrier waveform within the symbol period further comprises: communicating the single carrier waveform within the symbol period comprising a symbol level cyclic prefix and a respective cyclic prefix within each resource assignment of the plurality of time domain resource assignments.

Aspect 14: The method of any of aspects 11 through 13, wherein communicating the single carrier waveform within the symbol period further comprises: communicating the single carrier waveform within the symbol period comprising a respective cyclic prefix for each resource assignment of the plurality of time domain resource assignments.

Aspect 15: The method of any of aspects 11 through 14, wherein communicating the single carrier waveform within the symbol period further comprises: communicating the single carrier waveform within the symbol period comprising a symbol level cyclic prefix prior to a beginning resource assignment of the plurality of time domain resource assignments.

Aspect 16: The method of any of aspects 11 through 15, wherein communicating the single carrier waveform within the symbol period further comprises: communicating the single carrier waveform within the symbol period comprising a symbol level cyclic prefix and a cyclic prefix within at least one resource assignment of the plurality of time domain resource assignments.

Aspect 17: The method of any of aspects 11 through 16, wherein communicating the single carrier waveform within the symbol period further comprises: communicating the single carrier waveform within the symbol period comprising a respective guard interval within each resource assignment of the plurality of time domain resource assignments, wherein an additional guard interval occurs in a second symbol period preceding the symbol period.

Aspect 18: The method of any of aspects 11 through 17, wherein communicating the single carrier waveform within the symbol period further comprises: communicating the single carrier waveform within the symbol period based at least in part on a guard interval occurring in a second symbol period preceding the symbol period.

Aspect 19: The method of any of aspects 11 through 18, wherein communicating the single carrier waveform within the symbol period further comprises: communicating the single carrier waveform within the symbol period comprising a guard interval for at least one resource assignment of the plurality of time domain resource assignments, wherein an additional guard interval occurs in a second symbol period preceding the symbol period.

Aspect 20: The method of any of aspects 11 through 19, wherein communicating the single carrier waveform within the symbol period further comprises: communicating the single carrier waveform within the symbol period comprising a symbol level cyclic prefix preceding a beginning resource assignment of the plurality of time domain resource assignments and a guard interval within at least one of the plurality of time domain resource assignments.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a base station, comprising a processor; memory coupled with the processor; and instructions stored in the memory and executable by the processor to cause the apparatus to perform a method of any of aspects 11 through 20.

Aspect 25: An apparatus for wireless communications at a base station, comprising at least one means for performing a method of any of aspects 11 through 20.

Aspect 26: A non-transitory computer-readable medium storing code for wireless communications at a base station, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirt of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Additionally, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving, from a network device, a time domain resource assignment allocating a fraction of a symbol period in a time domain for communications with the network device, wherein the time domain resource assignment is one of a plurality of time domain resource assignments allocating a plurality of channels within the symbol period;
    identifying a time domain intra-symbol multiplexing configuration for the symbol period based at least in part on the time domain resource assignment; and
    communicating, with the network device, a single carrier waveform within the symbol period in accordance with the time domain intra-symbol multiplexing configuration and the time domain resource assignment.

2. The method of claim 1, wherein identifying the time domain intra-symbol multiplexing configuration comprises:
    receiving, from the network device, a control message indicating the time domain intra-symbol multiplexing configuration.

3. The method of claim 1, wherein communicating the single carrier waveform within the symbol period further comprises:
    communicating the single carrier waveform within the symbol period comprising a symbol level cyclic prefix and a cyclic prefix within a resource of the time domain resource assignment.

4. The method of claim 1, wherein communicating the single carrier waveform within the symbol period further comprises:
    communicating the single carrier waveform within the symbol period comprising a cyclic prefix preceding a resource of the time domain resource assignment.

5. The method of claim 1, wherein communicating the single carrier waveform within the symbol period further comprises:
    communicating the single carrier waveform within the symbol period comprising a symbol level cyclic prefix for the symbol period.

6. The method of claim 1, wherein communicating the single carrier waveform within the symbol period further comprises:
    communicating the single carrier waveform within the symbol period comprising a symbol level cyclic prefix and a cyclic prefix within at least one resource assignment of the plurality of time domain resource assignments.

7. The method of claim 1, wherein communicating the single carrier waveform within the symbol period further comprises:
    communicating the single carrier waveform within the symbol period comprising a guard interval corresponding to a resource of the time domain resource assignment, wherein an additional guard interval occurs in a second symbol period preceding the symbol period.

8. The method of claim 1, wherein communicating the single carrier waveform within the symbol period further comprises:
    communicating the single carrier waveform within the symbol period based at least in part on a guard interval occurring in a second symbol period preceding the symbol period.

9. The method of claim 1, wherein communicating the single carrier waveform within the symbol period further comprises:

communicating the single carrier waveform within the symbol period comprising a guard interval for at least one resource assignment of the plurality of time domain resource assignments, wherein an additional guard interval occurs in a second symbol period preceding the symbol period.

10. The method of claim 1, wherein communicating the single carrier waveform within the symbol period further comprises:
communicating the single carrier waveform within the symbol period comprising a symbol level cyclic prefix and a guard interval corresponding to a resource of the time domain resource assignment.

11. A method for wireless communications at a network device, comprising:
transmitting, to one or more user equipments (UEs), a plurality of time domain resource assignments that allocate a plurality of channels for respective fractions of a symbol period in a time domain;
identifying a time domain intra-symbol multiplexing configuration for the symbol period based at least in part on the plurality of time domain resource assignments; and
communicating, with the one or more UEs, a single carrier waveform within the symbol period in accordance with the time domain intra-symbol multiplexing configuration and the plurality of time domain resource assignments.

12. The method of claim 11, wherein identifying the time domain intra-symbol multiplexing configuration comprises:
transmitting, to the one or more UEs, a control message indicating the time domain intra-symbol multiplexing configuration.

13. The method of claim 11, wherein communicating the single carrier waveform within the symbol period further comprises:
communicating the single carrier waveform within the symbol period comprising a symbol level cyclic prefix and a respective cyclic prefix within each resource assignment of the plurality of time domain resource assignments.

14. The method of claim 11, wherein communicating the single carrier waveform within the symbol period further comprises:
communicating the single carrier waveform within the symbol period comprising a respective cyclic prefix for each resource assignment of the plurality of time domain resource assignments.

15. The method of claim 11, wherein communicating the single carrier waveform within the symbol period further comprises:
communicating the single carrier waveform within the symbol period comprising a symbol level cyclic prefix prior to a beginning resource assignment of the plurality of time domain resource assignments.

16. The method of claim 11, wherein communicating the single carrier waveform within the symbol period further comprises:
communicating the single carrier waveform within the symbol period comprising a symbol level cyclic prefix and a cyclic prefix within at least one resource assignment of the plurality of time domain resource assignments.

17. The method of claim 11, wherein communicating the single carrier waveform within the symbol period further comprises:
communicating the single carrier waveform within the symbol period comprising a respective guard interval within each resource assignment of the plurality of time domain resource assignments, wherein an additional guard interval occurs in a second symbol period preceding the symbol period.

18. The method of claim 11, wherein communicating the single carrier waveform within the symbol period further comprises:
communicating the single carrier waveform within the symbol period based at least in part on a guard interval occurring in a second symbol period preceding the symbol period.

19. The method of claim 11, wherein communicating the single carrier waveform within the symbol period further comprises:
communicating the single carrier waveform within the symbol period comprising a guard interval for at least one resource assignment of the plurality of time domain resource assignments, wherein an additional guard interval occurs in a second symbol period preceding the symbol period.

20. The method of claim 11, wherein communicating the single carrier waveform within the symbol period further comprises:
communicating the single carrier waveform within the symbol period comprising a symbol level cyclic prefix preceding a beginning resource assignment of the plurality of time domain resource assignments and a guard interval within at least one of the plurality of time domain resource assignments.

21. An apparatus for wireless communications at a user equipment (UE), comprising:
a processor;
memory coupled with the processor; and
instructions stored in the memory and executable by the processor to cause the apparatus to:
receive, from a network device, a time domain resource assignment allocating a fraction of a symbol period in a time domain for communications with the network device, wherein the time domain resource assignment is one of a plurality of time domain resource assignments allocating a plurality of channels within the symbol period;
identify a time domain intra-symbol multiplexing configuration for the symbol period based at least in part on the time domain resource assignment; and
communicate, with the network device, a single carrier waveform within the symbol period in accordance with the time domain intra-symbol multiplexing configuration and the time domain resource assignment.

22. The apparatus of claim 21, wherein the instructions to identify the time domain intra-symbol multiplexing configuration are executable by the processor to cause the apparatus to:
receive, from the network device, a control message indicating the time domain intra-symbol multiplexing configuration.

23. The apparatus of claim 21, wherein the instructions to communicate the single carrier waveform within the symbol period are further executable by the processor to cause the apparatus to:
communicate the single carrier waveform within the symbol period comprising a symbol level cyclic prefix and a cyclic prefix within a resource of the time domain resource assignment.

24. The apparatus of claim 21, wherein the instructions to communicate the single carrier waveform within the symbol period are further executable by the processor to cause the apparatus to:

communicate the single carrier waveform within the symbol period comprising a cyclic prefix preceding a resource of the time domain resource assignment.

25. The apparatus of claim 21, wherein the instructions to communicate the single carrier waveform within the symbol period are further executable by the processor to cause the apparatus to:

communicate the single carrier waveform within the symbol period comprising a symbol level cyclic prefix for the symbol period.

26. The apparatus of claim 21, wherein the instructions to communicate the single carrier waveform within the symbol period are further executable by the processor to cause the apparatus to:

communicate the single carrier waveform within the symbol period comprising a symbol level cyclic prefix and a cyclic prefix within at least one resource assignment of the plurality of time domain resource assignments.

27. The apparatus of claim 21, wherein the instructions to communicate the single carrier waveform within the symbol period are further executable by the processor to cause the apparatus to:

communicate the single carrier waveform within the symbol period comprising a guard interval corresponding to a resource of the time domain resource assignment, wherein an additional guard interval occurs in a second symbol period preceding the symbol period.

28. The apparatus of claim 21, wherein the instructions to communicate the single carrier waveform within the symbol period are further executable by the processor to cause the apparatus to:

communicate the single carrier waveform within the symbol period based at least in part on a guard interval occurring in a second symbol period preceding the symbol period.

29. An apparatus for wireless communications at a network device, comprising:

a processor;

memory coupled with the processor; and instructions stored in the memory and executable by the processor to cause the apparatus to:

transmit, to one or more user equipments (UEs), a plurality of time domain resource assignments that allocate a plurality of channels for respective fractions of a symbol period in a time domain;

identify a time domain intra-symbol multiplexing configuration for the symbol period based at least in part on the plurality of time domain resource assignments; and communicate, with the one or more UEs, a single carrier waveform within the symbol period in accordance with the time domain intra-symbol multiplexing configuration and the plurality of time domain resource assignments.

30. The apparatus of claim 29, wherein the instructions to identify the time domain intra-symbol multiplexing configuration are executable by the processor to cause the apparatus to:

transmit, to the one or more UEs, a control message indicating the time domain intra-symbol multiplexing configuration.

\* \* \* \* \*